(12) United States Patent
Whitworth et al.

(10) Patent No.: US 6,331,787 B1
(45) Date of Patent: Dec. 18, 2001

(54) TERMINATION CIRCUITS AND METHODS THEREFOR

(75) Inventors: Adam Whitworth, Sunnyvale; Dominick Richiuso, Saratoga, both of CA (US)

(73) Assignee: California Micro Devices Corporation, Milpitas, CA (US)

( * ) Notice: Subject to any disclaimer, the term of this patent is extended or adjusted under 35 U.S.C. 154(b) by 0 days.

(21) Appl. No.: 09/706,237

(22) Filed: Nov. 2, 2000

Related U.S. Application Data

(63) Continuation-in-part of application No. 09/605,919, filed on Jun. 28, 2000, which is a continuation of application No. 09/433,522, filed on Nov. 3, 1999, now Pat. No. 6,100,713, which is a continuation of application No. 09/074,525, filed on May 7, 1998, now Pat. No. 6,008,665.
(60) Provisional application No. 60/046,331, filed on May 7, 1997.

(51) Int. Cl.[7] .................. H03K 19/003; H03K 19/0175
(52) U.S. Cl. ................. 326/30; 326/86; 327/321
(58) Field of Search .................. 326/30, 56–58, 326/83, 86, 89, 90; 327/318, 321, 328

(56) References Cited

U.S. PATENT DOCUMENTS

| 5,021,684 | * | 6/1991 | Ahuja et al. | 326/27 |
|---|---|---|---|---|
| 5,206,544 | * | 4/1993 | Chen et al. | 326/30 |
| 5,528,190 | * | 6/1996 | Honnigford | 327/328 |
| 5,760,601 | * | 6/1998 | Frankeny | 326/30 |

* cited by examiner

Primary Examiner—Michael Tokar
Assistant Examiner—Daniel D. Chang
(74) Attorney, Agent, or Firm—Beyer Weaver & Themas LLP

(57) ABSTRACT

An active termination circuit for clamping a signal on a transmission line in an electronic device is described. The active termination circuit is configured to clamp the signal on the transmission line to one of a first reference voltage level and a second reference voltage level. In one embodiment, the active termination circuit includes a bottom clamping transistor coupled to a first potential having a bottom clamping transistor control node arranged for clamping the signal at about a first reference voltage. The active termination circuit also includes a top clamping transistor coupled to a second potential having a top clamping transistor control node arranged for clamping the signal at about a second reference voltage as well as stabilizing capacitors for stabilizing control node voltages.

22 Claims, 26 Drawing Sheets

TERMINATION CIRCUITS AND METHODS THEREFOR

CROSS REFERENCES TO RELATED APPLICATIONS

This application is a continuation-in-part of U.S. application Ser. No. 09/605,919 filed Jun. 28, 2000 and entitled "Termination Circuits and Methods Therefor" by inventors Jeffrey C. Kalb, John Jorgensen, Jeffrey C. Kalb Jr., and Dominick Richiuso which, in turn, is a continuation of U.S. application Ser. No. 09/433,522 filed Nov. 3, 1999 now U.S. Pat. No. 6, 100,713 and entitled "Termination Circuits and Methods Therefor" by inventors Jeffrey C. Kalb, John Jorgensen, Jeffrey C. Kalb Jr., and Dominick Richiuso which, in turn, is a continuation of U.S. application Ser. No. 09/074,525 filed May 7, 1998, now U.S. Pat. No. 6,008,665 and entitled "Termination Circuits and Methods Therefor" by inventors Jeffrey C. Kalb, John Jorgensen, Jeffrey C. Kalb Jr., and Dominick Richiuso which claims priority under 35 U.S.C 119 (e) of a provisional application U.S. application Ser. No. 60/046,331 entitled "Improved Termination Circuits and Methods Therefor" filed May 7, 1997 by inventors Jeffrey C. Kalb, John Jorgensen, Jeffrey C. Kalb Jr., and Dominick Richiuso. This application is also related to the following co-pending U.S. Patent applications which are filed concurrently with and assigned to the same assignee as this application, (i) U.S. patent application Ser. No. 09/705,425, entitled "Improved Termination Circuits and Methods Therefor" naming Adam Whitworth et al as inventors;

(ii) U.S. patent application Ser. No. 09/705,520, entitled "Improved Termination Circuits and Methods Therefor" naming Adam Whitworth et al as inventors;

(iii) U.S. patent application Ser. No. 09/705,595, entitled "Improved Termination Circuits and Methods Therefor" naming Adam Whitworth et al as inventors;

(iv) U.S. patent application Ser. No. 09/705,414, entitled "Improved Termination Circuits and Methods Therefor" naming Adam Whitworth et al as inventors;

(v) U.S. patent application Ser. No. 09/706,239, entitled "Improved Termination Circuits and Methods Therefor" naming Adam Whitworth et al as inventors; and (vi) U.S. patent application Ser. No. 09/705,423, entitled "Improved Termination Circuits and Methods Therefor" naming Adam Whitworth et al as inventors, each of which are herein incorporated by reference in their entireties.

BACKGROUND OF THE INVENTION

1. Field of the Invention

The present invention relates to termination circuits and methods therefor. More particularly, the present invention relates to termination circuits that provides fast and efficient clamping for signals transmitted via transmission lines in electronic systems.

2. Description of Relevant Art

In the design and implementation of electronic systems (such as digital computers, consumer/commercial electronic devices, or the like), particularly those employing integrated circuits, undesired transmission line effects are of a particular concern. As signals travel down transmission lines, e.g., traces on a printed circuit board, reflections may occur on the lines. The reflections are due to, for example, mismatched impedances between the driver circuit and the line, which may cause the signal to reflect back and forth, giving rise to ringing. These reflections and other undesired transmission lines effect are often exacerbated as the operating speed of the signal increases. If left uncorrected, the reflections may cause the signal's voltage to swing outside of the defined "0" or "1" voltage levels, thereby causing the receiving device to incorrectly interpret the signal received and generate erroneous results.

To address the impedance mismatch between the driver (or receiver) circuit and the transmission line, a variety of techniques has been tried in the prior art. FIG. 1A illustrates a resistor-terminated approach wherein a resistor 102 is inserted between the end of the transmission line and ground or alternately to the power supply. Resistor 102, whose value is chosen to provide impedance matching to the transmission line 106 so as to avoid reflections, thereby reventing the voltage on transmission line 106 to swing outside of the signal's defined operating ranges.

FIG. 1B illustrates an alternative series resistor-terminated approach herein impedance matching resistor 152 is inserted between driver circuit 104 and transmission line 106. Impedance matching resistor 152 provides impedance matching to transmission line 106. This system relies on a half voltage signal propagating down the line, being double in magnitude and propagating back to the driving end, at which point it sees a properly terminated line and stabilizes.

While the resistor-terminated approach proves suitable for some systems, there are disadvantages. For example, the use of an impedance matching resistor attenuates the signal, which lowers noise immunity while dramatically increasing power dissipation. To illustrate, the presence of resistor 102 forms essentially a resistor divider circuit between the characteristic impedance of line 106 and resistor 102, thereby lowering the signal's voltage level at the receiving circuit.

Further, the presence of resistor 102 increases the power dissipation, which increases the load on the driver circuit and causes additional heat to be generated as well as more power from the system's supply. The presence of resistor 152 in FIG. 1B creates a situation in which the input to any other device which might be connected to the transmission line sits at half amplitude, an undesirable condition while the line is settling. Still further, it is often difficult to provide impedance matching for transmission lines whose characteristic impedance may change with the system's configuration. By way of example, transmission lines coupling with a computer's memory system may terminate at a plurality of memory slots. Depending on the amount of memory provisioned, some or all of these slots may be occupied. As can be appreciated from the foregoing, the characteristic impedance of these transmission lines may depend on the number of memory slots occupied. The variable impedance of these transmission lines makes it difficult to address impedance matching using resistors.

Diode-terminated matching circuits represent another approach to minimizing reflections on transmission lines. FIG. 2 illustrates a simplified diode-terminated matching circuit 200, comprising diodes 202 and 204. As shown in FIG. 2, diode 202 is coupled between common terminal 206 and one rail voltage (ground in this case). Diode 204 is coupled between common terminal 206 and the other rail voltage ($V_{DD}$ in this case). As the signal travels down line 106, reflections increase the voltage thereon, causing the diodes to turn on to clamp the voltage on line 106 at the prescribed clamping voltages. In the case of FIG. 2, the clamping voltages are $V_{DD}+V_{TD}$ and ground $-V_{TD}$ wherein $V_{TD}$ represents the forward drop voltage of the diode. To ensure quick turn off of the diodes when the line's voltage is within the prescribed clamping voltages, Schottky diodes are typically employed.

In the diode-terminated approach, impedance matching is not critical. Accordingly, the diode-terminated approach is more suitable for transmission lines whose characteristic impedance may be variable. It is believed that such approaches have been in common use since the late 1960's. As the operating voltages of electronic devices decrease, however, diode-terminated clamping circuits prove inadequate. By way of example, it is contemplated that microprocessors or memory circuit employing 0.1 micron technology may operate with operating voltages as low as 1 volt. Since the forward drop voltage of a Schottky diode is typically around 0.6 V, the diode-terminated clamping circuit will not start to clamp until the voltage on the transmission line swings above 1.6 V ($V_{DD}$+$V_{TD}$) or below –0.6 V (–$V_{TD}$). In other words, the voltage on the transmission line may vary by up to 60% before clamping begins. Such a wide disparity between the clamp voltage and the operating voltage makes this application of diodes ineffective.

Although manufacturers of electronic systems have long desired an easy-to-implement termination circuit design that can provide efficient clamping for modem high speed, low voltage signals, most of the attempts have been in the direction of improving the diode-terminated approach (e.g., by attempting to reduce the forward bias voltage of the diodes in the diode-terminated solution) or the resistor-terminated approach. This is because the task of addressing impedance mismatches at the board level is typically assigned to VLSI digital engineers, who have more familiarity with digital systems techniques than the complexities of analog line terminations. If analog engineers are assigned to the task, they typically have more familiarity with analog circuitry, e.g., diodes/resistors, than with VLSI design principles. By way of example, when the diode drops are too high, the engineers typically turn to tuning the termination system with resistors. In doing so, they increase power dissipation or in other ways impact system performance as indicated above.

With current fabrication technology, a reliable zero voltage forward bias diode has not been found. Accordingly, current diode-terminated designs continue to prove unsuitable for use with modem low voltage circuits. Moreover, even if such a diode could be obtained, the diode-terminated clamping circuit (as well as the resistor-terminated clamping circuit for that matter) cannot be easily integrated into modem CMOS (complementary metal oxide semiconductor) receiving or driving circuits, such as microprocessor or memory circuits. Typically, these approaches require that the termination circuit be implemented as a separate, stand-alone chip. For designs that are form-factor limited, e.g., small or portable electronic systems, this requirement is highly disadvantageous since it requires additional space on the circuit board and increases costs.

In view of the foregoing, there are desired improved termination circuits and methods therefor that advantageously provide fast and efficient clamping for signals transmitted via transmission lines in electronic systems, particularly signals having low operating voltage ranges.

SUMMARY OF THE INVENTION

The present invention describes, in one embodiment, to an active termination circuit for clamping a signal on a transmission line in an electronic device. The active termination circuit includes a bottom clamping transistor coupled to a first potential having a bottom clamping transistor control node arranged for clamping the signal at about a first reference voltage, and a bottom threshold reference transistor coupled to a first reference voltage supply configured to supply the first reference voltage. The first threshold reference transistor provides a first bias voltage to the bottom clamping transistor control node that biases the bottom clamping transistor control node at about a first threshold voltage above the first reference voltage. The first threshold voltage represents a threshold voltage of the first clamping transistor. The active termination circuit also includes a top clamping transistor coupled to a second potential having a top clamping transistor control node arranged for clamping the signal at about a second reference voltage and a top threshold reference transistor coupled to a second reference voltage supply configured to supply the second reference voltage. The top threshold reference transistor provides a second bias voltage to the top clamping transistor control node that biases the top clamping transistor control node at about a second threshold voltage below the second reference voltage. The second threshold voltage represents a top clamping transistor threshold voltage reference voltage. The active circuit further includes a first stabilizing capacitor coupled between the bottom clamping transistor control node and a first stable voltage supply and a second stabilizing capacitor coupled between the top clamping transistor control node and second stable voltage supply.

In another embodiment, a method of clamping a signal on a transmission line to one of a first and a second reference voltage is described.

These and other advantages of the present invention will become apparent upon reading the following detailed descriptions and studying the various drawings.

DETAILED DESCRIPTION OF THE INVENTION

The present invention will now be described in detail with reference to a few preferred embodiments thereof as illustrated in the accompanying drawings. In the following description, numerous specific details are set forth in order to however, to one skilled in the art, that the present invention may be practiced without some or all of these specific details. In other instances, well known process steps and/or structures have not been described in detail in order to not unnecessarily obscure the present invention.

In accordance with one embodiment of the present invention, there are provided improved active termination circuits for clamping signals traversing transmission lines of an electronic system. The improved active termination circuits advantageously employ active devices, (such as, for example, transistors) for clamping signals while facilitating high speed operation and low power consumption. Unlike prior art diode-terminated clamping circuits, the inventive active termination circuits are arranged to provide satisfactory clamping at or substantially at the rail voltages of the signal, thereby simulating the effect of a zero threshold diode and rendering them suitable for use with the low voltage signals of modem electronic devices while retaining compatibility with higher voltage devices as well.

In the described embodiment, the inventive active includes an first clamping transistor having a first node coupled to a transmission line, a first gate node coupled to a first stable voltage source by way of a first stabilizing capacitor. The circuit also includes a second clamping transistor having a second node coupled to the transmission line and a second gate node coupled to a second stable voltage source such that any gate threshold potential excursion at either the first or the second gate nodes are substantially reduced as compared to those situations where the stabilizing capacitors are not present.

Figure 3:
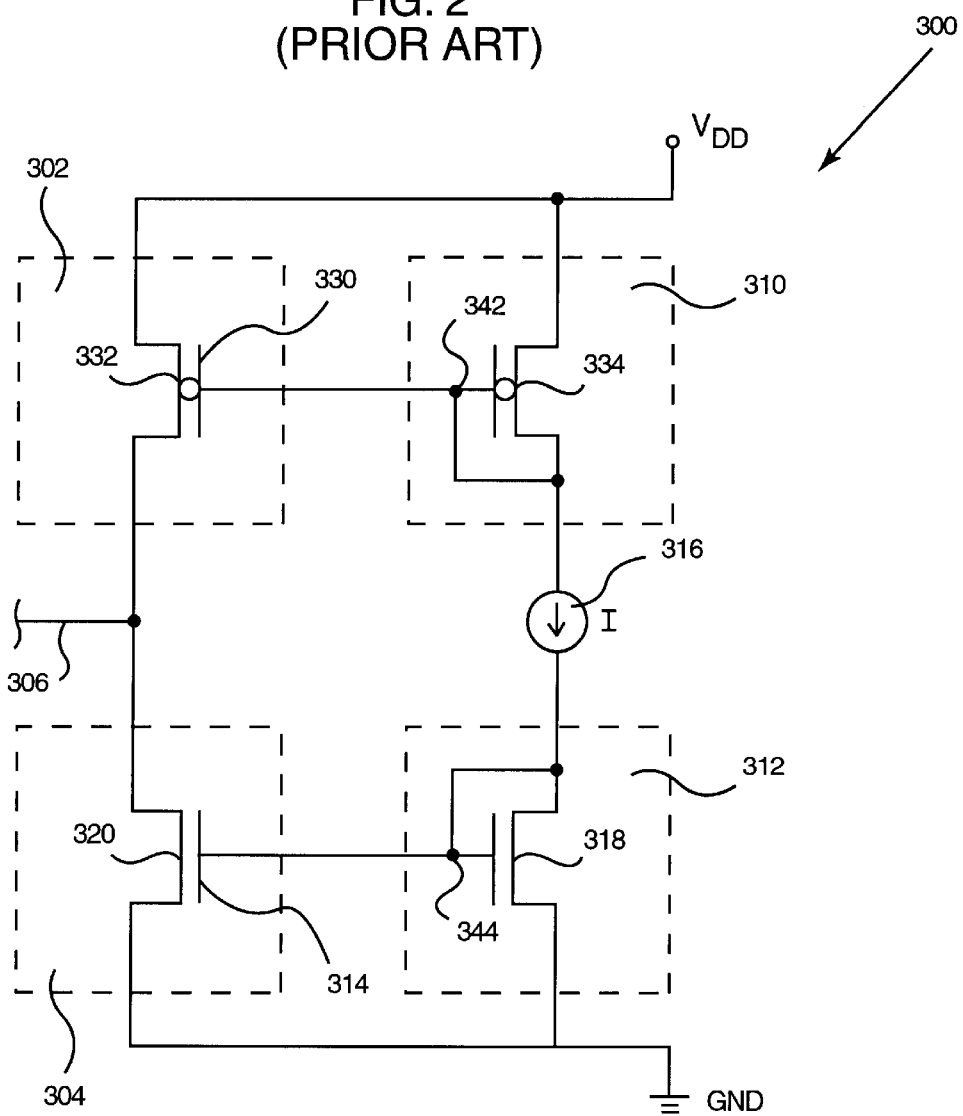
FIG. 3 illustrates, in accordance with one embodiment of the present invention, a CMOS implementation of the inventive active termination circuit.

To further discuss the advantages and features of the invention, FIG. 3 illustrates, in accordance with one embodiment of the present invention, the inventive termination circuit 300 for terminating signals traversing transmission lines of electronic systems. As show in FIG. 3, termination circuit 300 includes a top active clamping device 302 and a bottom active clamping device 304. In the embodiment of FIG. 3, top active clamping device 302 is implemented by a p-channel MOS device 332 and serves to clamp the signal on a transmission line 306 at about the upper rail voltage (e.g., $V_{DD}$). On the other hand, bottom active clamping device 304 is implemented by an n-channel MOS device 320 and serves to clamp the signal on transmission line 306 at the lower rail voltage (e.g., ground or GND). In accordance with the convention utilized herein, the top devices are employed to clamp the voltage level of the signal on the transmission line at its upper range (e.g., to about $V_{DD}$), while the bottom devices are employed to clamp the voltage level of the signal at its lower range (e.g., to about ground).

The source of MOS device 332 is coupled to $V_{DD}$ while the source of MOS device 320 is coupled to ground. The drains of devices 332 and 320 are both coupled to transmission line 306 as shown. Referring now to bottom active clamping device 304, a gate 314 of MOS device 320 is coupled to both the gate and drain of a bottom threshold reference device 312. As shown in FIG. 3, bottom threshold reference device 312 includes a n-channel MOS device 318, which is arranged in a gate-to-drain connected configuration.

When sufficient current flows into the drain of n-channel MOS device 318 (the current may be sourced from any conventional current sourcing arrangement, which is shown symbolically by current source 316 in FIG. 3), gate 314 of bottom active clamping device 304 is biased at about one threshold voltage $V_T$ of n-channel MOS device 318 above ground. Typically, the voltage at gate 314 is biased at the threshold voltage $V_T$ of n-channel MOS device 318 plus a small amount of overdrive voltage necessary to sustain the current through device 318. It should be noted that the current source 316 can be either a constant current source or a variable current source (VCS) depending on the applications for which the termination circuit 300 is anticipated to be used.

When the signal on transmission line 306 begins to reflect and dips below ground, i.e., as soon as the potential difference between the gate of n-channel MOS device 320 of bottom active clamping device 304 and its source exceeds $V_T$, n-channel device 320 begins to conduct to source current from its drain, which is connected to ground as shown in FIG. 3. Accordingly, the signal is clamped at about or slightly below ground. As noted, gate 314 of n-channel device 320 is typically biased slightly above $V_T$. Consequently, it is typically the case that n-channel device 320 begins to conduct when the signal on transmission line 306 is slightly above ground (e.g., perhaps 0.1 V above ground). In this manner, n-channel device 320 would be in full conduction when the signal on transmission line 306 dips below ground.

Since both n-channel device 318 and n-channel device 320 may be fabricated on the same die, their threshold voltages $V_T$ will be substantially equal irrespective of process variation. Therefore, n-channel device 320, which has its gate potential biased by $V_T$ of n-channel device 318, can readily turn on as soon as the signal on transmission line 306 drops below ground (or even near ground).

A similar arrangement exists with reference to gate 330 of the p-channel MOS device 332 of top active clamping device 302. Gate 330 is coupled to the gate and drain of p-channel MOS device 334. The source of p-channel device 330 is coupled to $V_{DD}$ as shown. When sufficient current flows into the drain of p-channel device 334, gate 330 of p-channel device 332 is biased at about $V_{DD}-V_T$, where $V_T$ is the threshold voltage of p-channel MOS device 334. Actually, gate 330 of p-channel device 332 is biased slightly below this value ($V_{DD}-V_T$) due to the presence of the overdrive voltage necessary to sustain current through p-channel MOS device 334.

When the signal on transmission line 306 begins to reflect and rises above $V_{DD}$, p-channel MOS device 332 turns on to clamp this signal at about $V_{DD}$. Due to the presence of the aforementioned overdrive voltage, p-channel MOS device 332 typically turns on slightly before the voltage level of the signal on transmission line 306 reaches $V_{DD}$, thereby ensuring that p-channel MOS device 302 is fully turned on when the signal's voltage level exceeds $V_{DD}$. Again, the fact that both p-channel devices 332 and 334 may be fabricated on the same die ensures that their threshold voltages $V_T$ are substantially equal irrespective of process variations.

P-channel MOS device 332 and N-channel MOS device 320 are preferably sized such that their clamp impedance when they are turned on is substantially lower than the characteristic impedance of transmission line 306 (e.g., lower than about 50 Ω in one embodiment). In some cases, the drain-to-gate parasitic capacitance of n-channel device 320 may cause the voltage on gate 314 to vary as the voltage level of the signal on transmission line 306 changes (the impedance at node 344 looking into n-channel MOS device 318 is typically quite high since little current flows through n-channel MOS device 318). In these cases, it may be advantageous to stabilize the voltage level at gate 314 of n-channel MOS device 320 using an appropriate voltage stabilizing circuit.

In one embodiment, it is contemplated that node 344 may be coupled to an internal or external capacitor of an appropriate size (e.g., about 10× the drain-to-gate parasitic capacitance). Note that a similar issue also exists with respect to node 342, and it may be advantageous to provide node 342 with a similar voltage stabilizing circuit to ensure that p-channel MOS device 332 turns on reliably when the voltage level of the signal on transmission line 306 attempts to jump the $V_{DD}$ rail.

As can be appreciated by those skilled in the art, termination circuit 300 advantageously clamps the voltage on the terminated transmission line to the rail voltages as soon as the signal's voltage attempts to exceed the rails. Due to the use of the threshold reference devices (devices 310 and 312), top active clamping device 302 and bottom active clamping device 304 act as "zero-threshold" transistors, i.e., they clamp as soon as the signal's voltage exceed $V_{DD}$ and ground. This is a substantial advantage over prior art diode-terminated approaches, which cannot begin to clamp until the signal's voltage exceed the rails by the forward drop voltage of the electrodes (e.g., by about 0.6 V typically). As such, the inventive active termination circuit is highly suitable for use with modern low voltage signals.

The termination circuit of FIG. 3 may be fabricated in an external termination component (e.g., by putting a plurality of termination circuits 300 on a separate chip for use with existing receiver/driver circuits). Equally advantageously, termination circuit 300 may readily be incorporated into the CMOS receiver or driver circuit, e.g., the CMOS microprocessor or CMOS memory devices. The ease with which termination circuit 300 can be integrated into CMOS receiver or driver circuits using conventional VLSI design methodologies solves a long-felt need in the industry since it facilitates signal termination while requiring few, if any, additional processing step in the fabrication of the CMOS receiver or driver circuit. The ability to integrate the termination circuit right into existing receiver or driver circuits eliminates the need for external termination component, thereby saving space on the circuit board, which is a significant concern for designers of small form-factor electronic systems (e.g., portable computers, portable electronic devices, and the like.

Figure 1A:
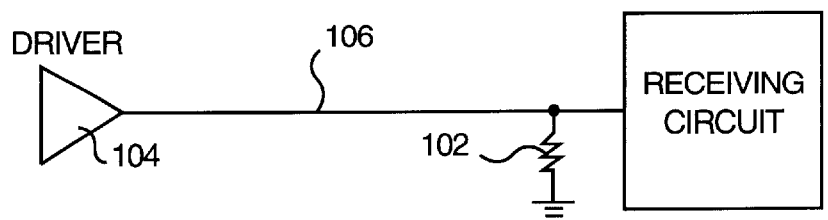
FIGS. 1A and 1B illustrate in general detail various prior art resistor-terminated approaches for clamping signals.
Figure 1B:
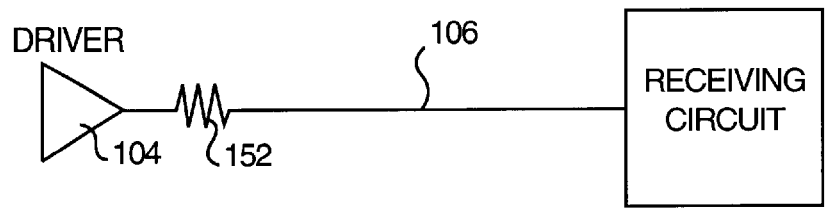

Further, termination circuit 300 dissipates substantially less power compared to either the resistor-terminated solution of FIGS. 1A and 1B. Although p-channel device 334 and n-channel device 318 of the threshold reference devices stay on at all times, these devices may be arranged to conduct very little current (e.g., 1 to 2 mA, which is typically a factor of 20 less than that consumed in FIG. 1A) since they only have to conduct enough current to sustain the threshold voltage at gates 330 and 314. When MOS devices 332 and 320 of the clamping devices turn on (i.e., when the voltage level of the signal on transmission line 306 exceeds the rail voltages), the low clamping voltage minimizes power consumption. These features make termination circuit 300 particularly suitable for use in battery-operated electronic systems.

Additionally, it should be appreciated that the use of active devices in termination circuit 300 facilitate fast clamping. Since clamping occurs as soon as the voltage level on transmission line 306 exceeds the rail voltages (or even slightly before) and is essentially independent of the characteristic impedance of the transmission line, termination circuit 300 is essentially self-tuning. Accordingly, termination circuit 300 is highly suitable for use in terminating transmission lines whose characteristic impedance may change depending on the configuration of the electronic system (e.g., data lines leading to memory banks).

Figure 4:
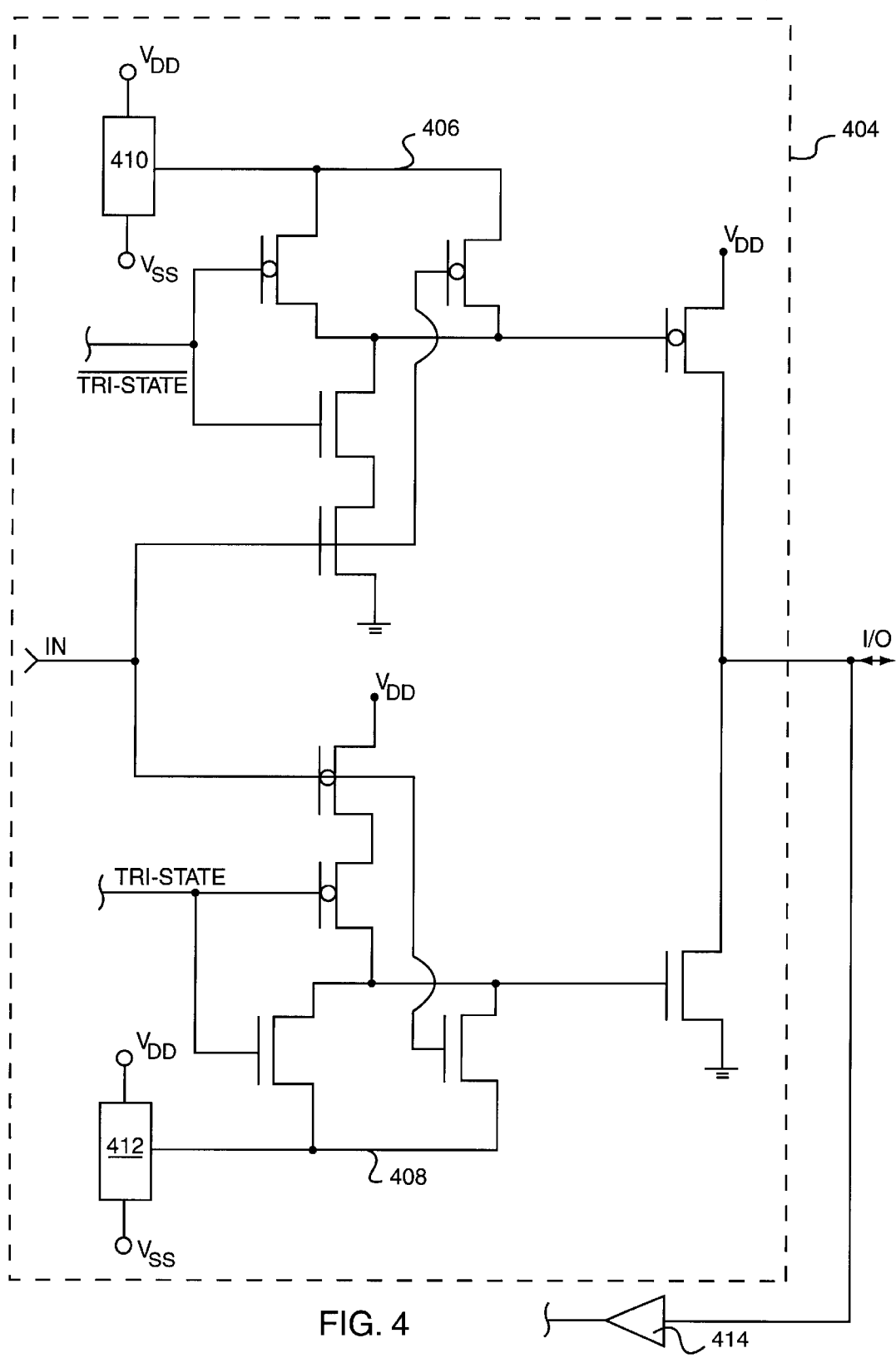
FIG. 4 illustrates, in accordance with one embodiment of the present invention, a CMOS implementation of the inventive termination circuit for tri-stated signals.

The active termination embodiment proposed in FIG. 3 is particularly suitable for use with CMOS tri-state circuits. As one example, FIG. 4 illustrates a tri-state termination circuit 400 having an output driver 404, an input receiver 414, and tri-state control signals. If node 406 is coupled to a bias voltage of about $V_{DD}-V_T$ (as generated by voltage reference block 410) instead of $V_{DD}$, and node 408 is coupled to a bias voltage of about $+V_T$ (as generated by voltage reference block 412) instead of ground, tri-state circuit 416 can also serve as a termination circuit to clamp the voltage level of the signal on transmission line 402 when the control signals place tri-state circuit 416 in the "tri-state" mode.

It should be noted, by way of example, that node 342 of top threshold reference device 310 of FIG. 3 may be used as the reference voltage for node 406 of FIG. 4. Similarly, other embodiments of voltage reference circuit 410 may be used to supply a bias voltage to node 406 of FIG. 4. In the same manner, node 344 of bottom threshold reference device 312 of FIG. 3 may be used as the reference voltage for node 408 of FIG. 4. Similarly, other embodiments of voltage reference circuit 412 may be used to supply a bias voltage to node 408 of FIG. 4. Although FIG. 4 shows one particular implementation of the active termination tri-state circuit, one of ordinary skill in the art will appreciate that the technique disclosed herein is also applicable to other tri-state designs.

It should also be noted that the above-mentioned techniques are equally applicable for drivers which are non tri-state. It should be appreciated that such a circuit as described in FIG. 4, or analogous circuits, may be easily integrated into existing CMOS I/O circuits, thereby permitting the driver circuit to furnish both the driver (tri-state or non tri-state) function and the termination function in the same process with minimal design changes and/or minimal additional space on the die.

Figure 5:
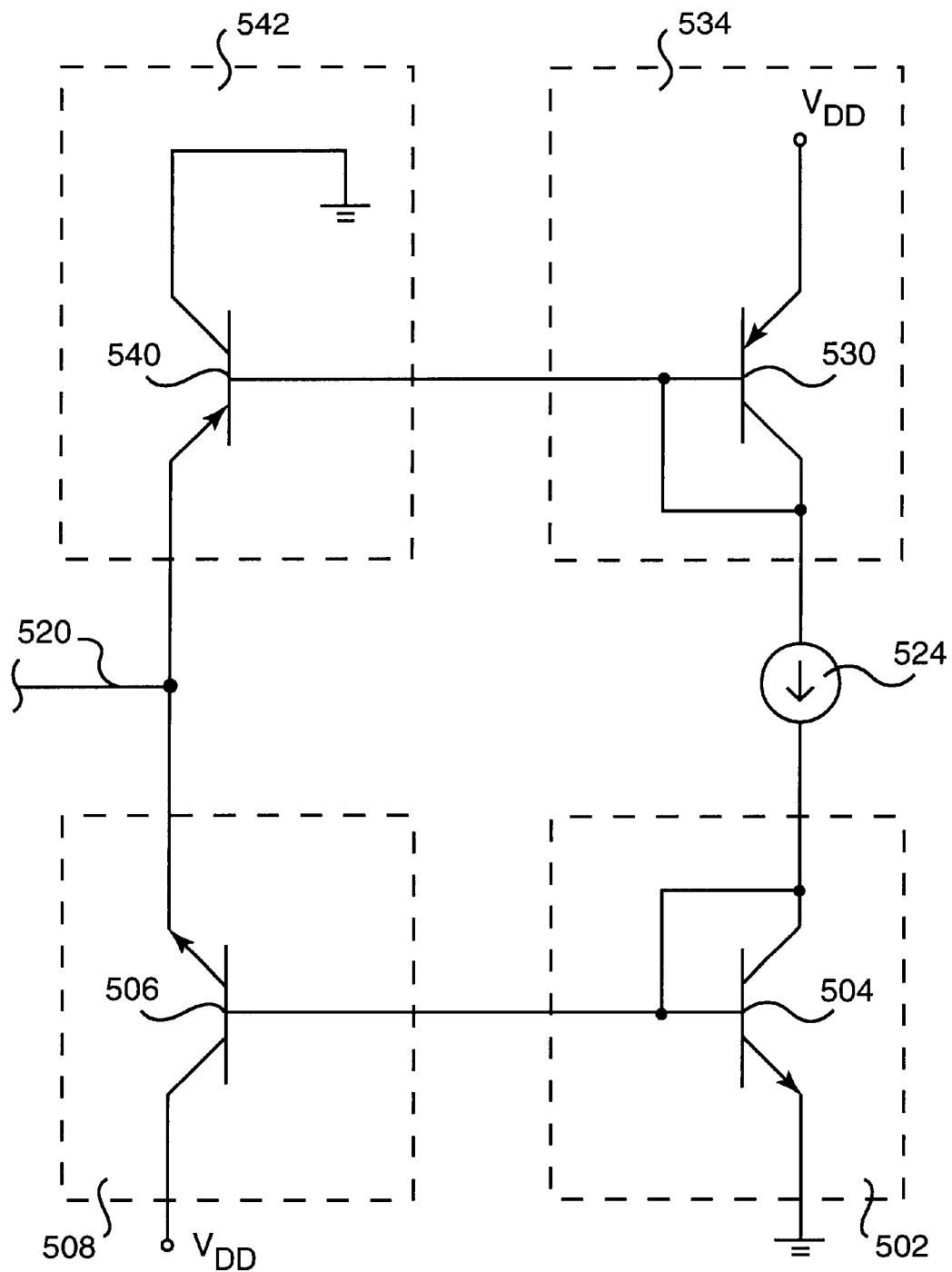
FIG. 5 illustrates, in accordance with one embodiment of the present invention, a bipolar implementation of the inventive active termination circuit.

FIG. 5 illustrates, in accordance with one embodiment of the present invention, a bipolar implementation of the inventive active termination circuit. The operating principle behind the termination circuit of FIG. 5 is analogous to the operating principle behind the termination circuit of FIG. 3, with the exception that the top and bottom clamping devices of FIG. 5, as well as the top and bottom threshold reference devices, have been implemented using bipolar technology. Bipolar technology allows the termination circuit to be readily integrated into a bipolar receiver/driver circuit (although stand-alone implementation is certainly possible to permit the termination circuit of FIG. 5 to work with existing electronic devices). Further, bipolar technology may have some advantages, e.g., higher speed and smaller size, among others. Additionally, the bipolar termination may, in some cases, have an even lower effective impedance than the CMOS implementation.

Referring now to FIG. 5, there is shown a bottom threshold setting device 502, which includes an n-p-n transistor 504. Transistor 504, which is arranged in a collector-to-base connected configuration, has its emitter coupled to ground and its base coupled to the base of n-p-n transistor 506 of bottom clamping device 508. The function of bottom threshold device 502 is to furnish a voltage of about $+V_{BE}$ above ground to the base of n-p-n transistor 506 when a sufficient amount of current flows through n-p-n transistor 504 (the current is sourced into the collector of n-p-n transistor 504 using a conventional transistor sourcing arrangement, which is represented symbolically in FIG. 5 by current source 524).

When the voltage level on a transmission line 520 goes slightly below ground, n-p-n transistor 506 starts to conduct, thereby clamping the voltage at about ground. Again, the presence of a small overdrive voltage to sustain conduction in transistor 504 may cause the base of n-p-n transistor 506 to be biased at slightly above $+V_{BE}$, causing n-p-n transistor 506 to turn on slightly before the signal's voltage reaches ground. In this manner, it is ensured that transistor 506 is fully turned on when the signal's voltage dips below ground.

Note that the collector of n-p-n transistor 506 is advantageously coupled to $V_{DD}$ instead of to ground to ensure that transistor 506 is substantially off until clamping commences. If the collector of transistor 506 was coupled to ground instead, the high $\beta$ of this transistor would have caused a nontrivial amount of current to flow even when the voltage level of the signal on transmission line 520 is within the rails, thereby significantly increasing power consumption.

Collector-to-base connected p-n-p transistor 530 of top threshold device 534 biases the voltage at the base of p-n-p transistor 540 of top clamping device 542 at about $V_{DD}-V_{BE}$. As the signal's voltage on transmission line 520 exceeds $V_{DD}$ (or at slightly below $V_{DD}$ due to the presence of the overdrive voltage that sustains conduction in transistor 530), p-n-p transistor 540 turns on to clamp the voltage's level at about $V_{DD}$.

In some cases, the base-to-emitter parasitic capacitance of transistors 506 and 540 may require additional voltage stabilizing circuits to be coupled to the gates of these transistors to ensure that these transistors clamp reliably while the voltage level on transmission line 520 varies. Conventional voltage stabilizing approaches, including those discussed in connection with FIG. 3, may be employed for voltage stabilization.

It should be appreciated that the termination circuit of FIG. 5 has the same self-tuning, flexible implementation (separate or integrated into the driver/receiver circuit), and low clamping voltage features discussed earlier in connection with FIG. 3. However, power consumption for the termination circuit of FIG. 5 may be slightly higher than that of FIG. 3. This is because current is sourced from ground, i.e., from the collector end of p-n-p transistor 540 (instead of from $V_{DD}$ as in the case of FIG. 3), when the signal's voltage exceeds $V_{DD}$. The higher voltage across transistor 540 when it conducts occurs may lead to increased power consumption. Similarly, current is sourced from $V_{DD}$, i.e., from the collector end of n-p-n transistor 506 (instead of from ground as in the case of FIG. 3), when the signal's voltage exceeds ground. The higher voltage across transistor 506 when it conducts may also lead to increased power consumption.

Figure 6:
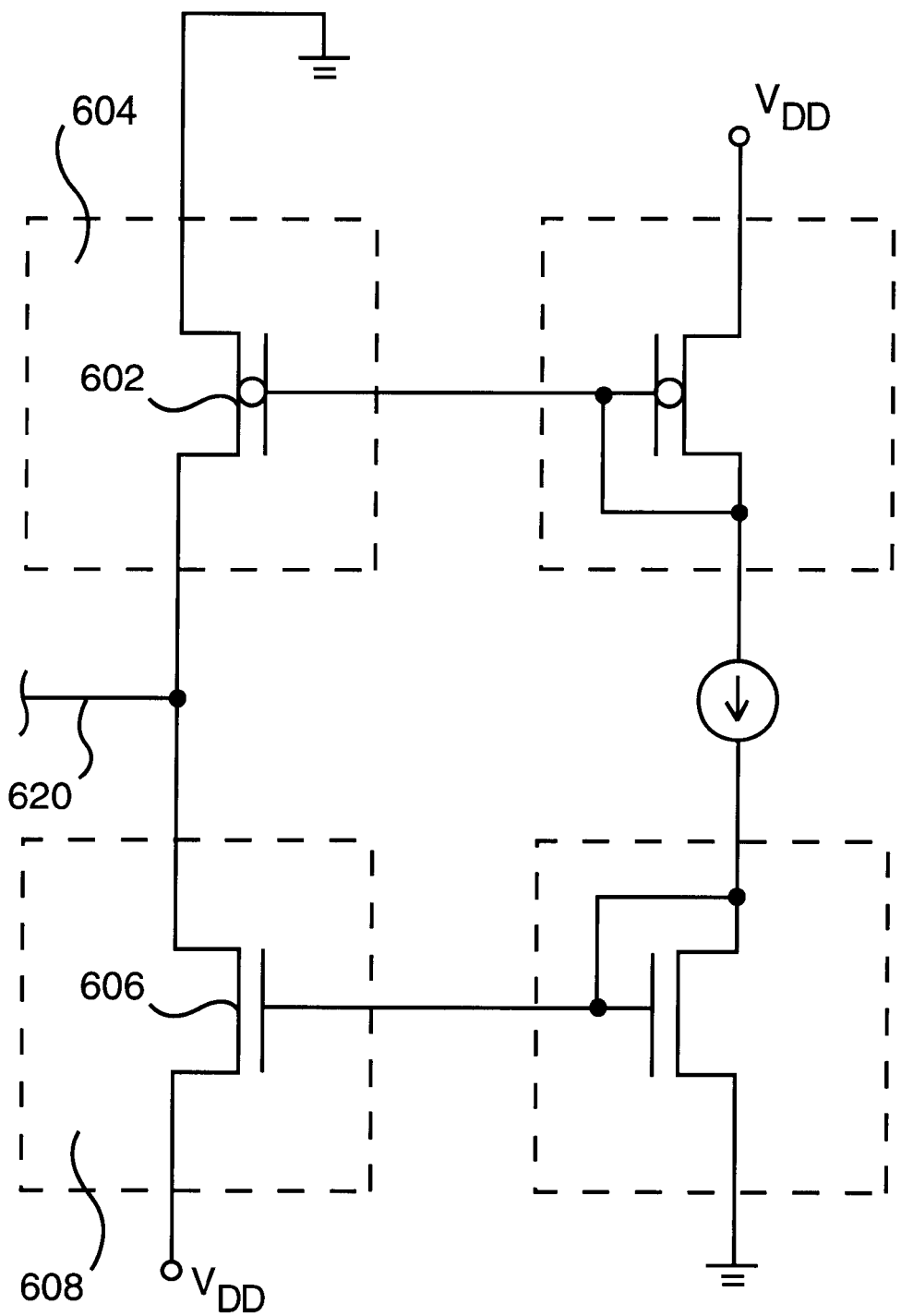
FIG. 6 illustrates, in accordance with one embodiment of the present invention, an alternative CMOS implementation of the inventive termination circuit.

FIG. 6 illustrates an alternative CMOS embodiment wherein a p-channel device 602 of a top clamping device 604 is coupled to ground (instead of $V_{DD}$ as in the case of FIG. 3). Conversely, an n-channel device 606 of a bottom clamping device 608 is coupled to $V_{DD}$ instead of to ground. The remainder of the termination circuit of FIG. 6 is substantially analogous to the remainder of the termination circuit of FIG. 3.

When the voltage level on transmission line 620 dips below ground (or approaches it due to the presence of the aforementioned overdrive voltage), the current that clamps the voltage to ground comes from $V_{DD}$ instead of ground (as in the case of FIG. 3). Conversely, when the voltage level on transmission line 620 exceeds $V_{DD}$ (or approaches it due to the presence of the aforementioned overdrive voltage), the current that clamps the voltage to $V_{DD}$ comes from ground instead of $V_{DD}$ (as in the case of FIG. 3). This arrangement, like that of FIG. 4, ensures that p-channel device 602 and n-channel device 606 more completely turn off when the voltage level on transmission line 620 is within the rails.

Additionally, there is a large voltage from drain to source across these transistors while clamping. The increased conduction permits these transistors to be sized smaller, thereby advantageously reducing area and capacitance, leading to increased speed. It should be appreciated that the termination circuit of FIG. 6 also has the same self-tuning, flexible implementation (separate or integrated into the driver/ receiver circuit), and low clamping voltage features discussed earlier in connection with FIGS. 3 and 5. However, the larger voltage across the clamping transistors 602 and 606 during clamping may increase power consumption. As before, the aforementioned voltage stabilizing circuit may, in some cases, be coupled to the gates of transistors 602 and 606 to ensure that top clamping device 604 and bottom clamping device 608 clamp reliably even if the voltage level on transmission line 620 vary.

ADDITIONAL DISCUSSION, EXAMPLES AND APPLICATIONS

To more fully discuss the theories and applications of the present invention, the following discussion is included to supplement understanding. In particular, issues including impedance mismatches are discussed in greater detail to facilitate an understanding of the difficulties inherent in the prior art approaches and the advantages of the present invention.

In the design and implementation of electronic systems such as computers, consumer/commercial electronic devices, and the like, particularly those employing integrated circuits (ICs), the issue of transmission line termination is a major issue. When signals propagate down a transmission line and encounter impedance mismatches at the end of the line, they are reflected back and forth across the line causing what is normally described as ringing.

The typical response to this problem is to terminate the transmission lines with an impedance equal to the characteristic impedance of the lines. The problem with this is that such a system greatly increases the power dissipation of the system, increases the required drive capability of the circuits, causing problems for other devices that might be connected midway along the line, or a number of other issues depending on the solution chosen.

As a result, designers prefer logic systems which do not require such terminators. When TTL (Transistor-Transistor Logic) circuits were becoming popular, they did not use terminations but suffered from severe ringing and noise problems. It was almost impossible to build large systems.

Another approach is to employ TTL circuits which have clamp diodes at the inputs. While these diodes did not impact the termination impedance within the operating range of the device—and thus consumed no extra power, as soon as waveform at the input overshot or undershot the clamping voltages (typically rail voltages +/− the diode's forward drop voltage) the diode clamps would come into action, clamping the reflections, and keeping the operating signal within predefined levels. The fundamental concept underlying such a termination system is that one can use non-linear termination devices that provide proper termination outside of the normal operating range while retaining a high characteristic impedance within the operating range.

Figure 7:
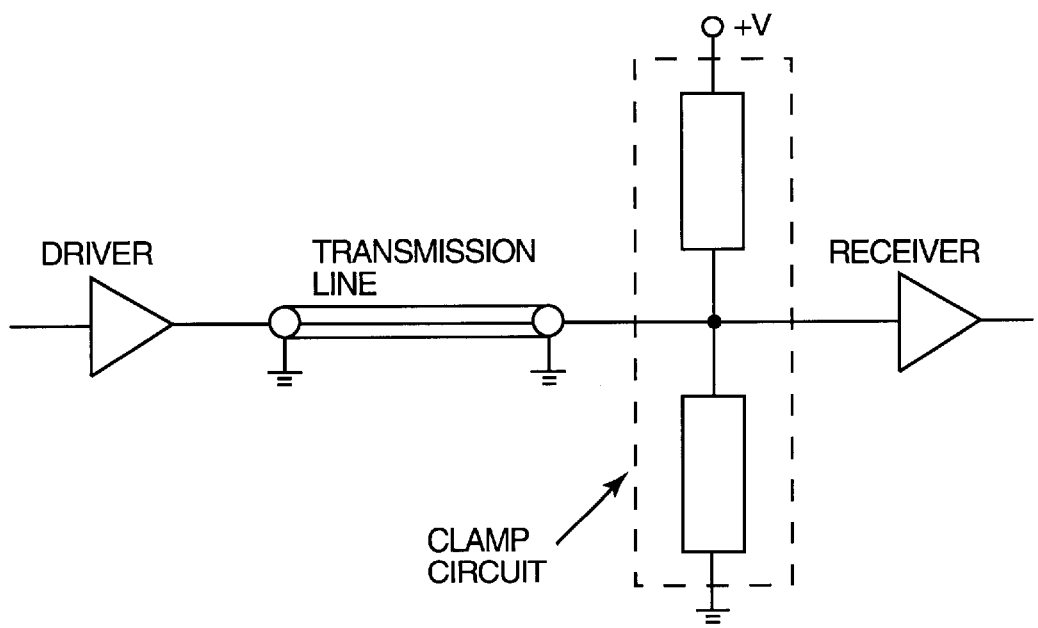
FIG. 7 illustrates a general circuit configuration having a driver circuit, a transmission line, a receiver circuit and a termination device associated therewith to facilitate discussion.
Figure 2:
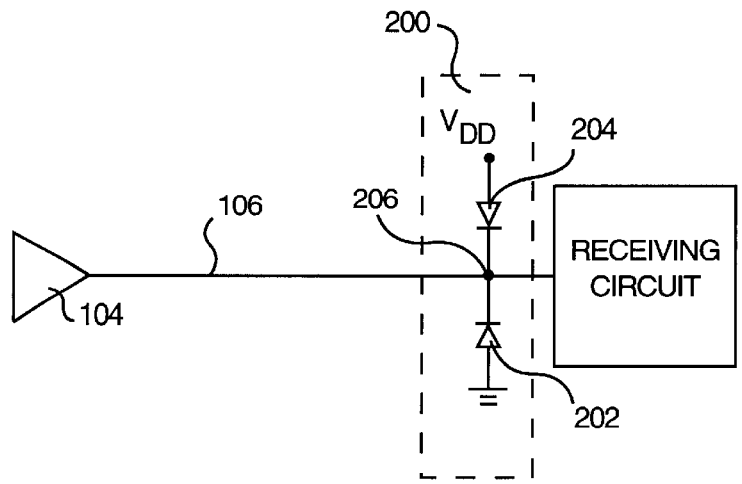
FIG. 2 illustrates a simplified prior art diode-terminated approach for clamping signals.

FIG. 7 below shows the general circuit configuration applicable to all of the following discussions. It shows a circuit driving a transmission line with a receiving device on the other end. The dotted box shows the application of a clamp or other form of termination at the receiving end.

Figure 8A:
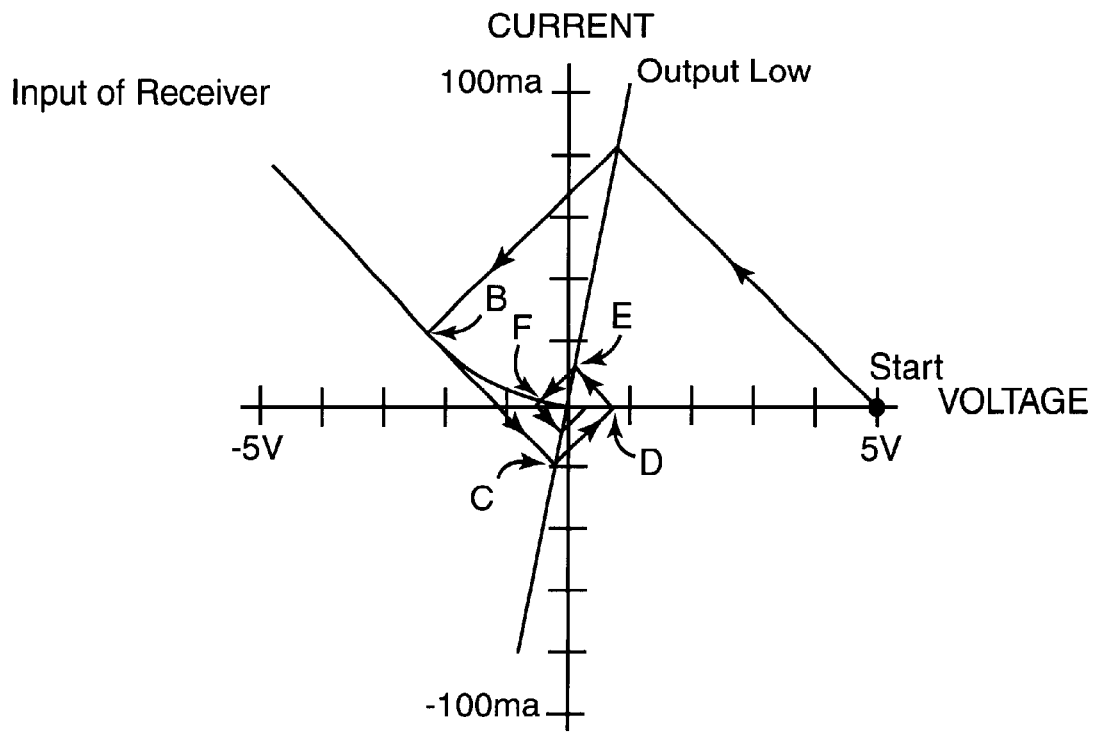
FIGS. 8A and 8B depict a voltage-current diagram and a voltage-time diagram, respectively, to facilitate discussion of the problems associated with transmission systems having no special diode clamping.
Figure 8B:
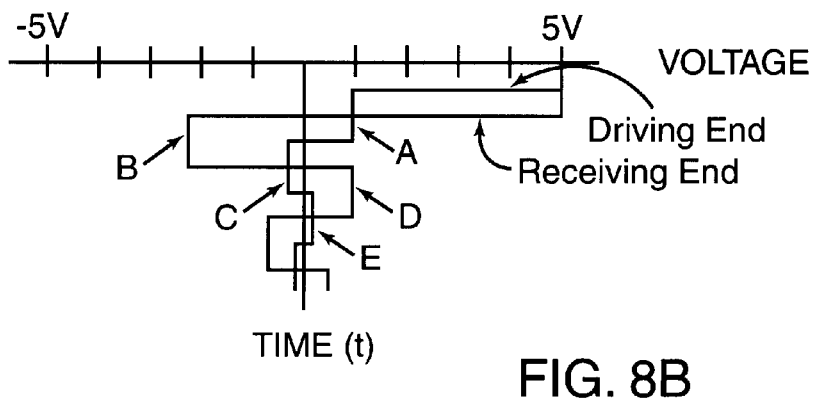

FIGS. 8A and 8B below illustrates the problems. It shows a traditional CMOS or TTL situation without special diode clamping. (Note that the analysis and discussion presented below related specifically to a falling waveform and the lower half of all the clamp circuits shown in this paper. But an analogous discussion could be had relative to a rising waveform and the upper half of the clamp circuit.)

FIG. 8A is a voltage-current diagram that describes what happens electrically on the transmission line. If a 50 Ohm transmission line is initially stabilized at 5V (right hand side of FIG. 8A labeled "Start") and the output of a driver turns on (Output low), the current waveform which will propagate down the line can be graphically derived by drawing a 50 Ohm impedance line from the "Start" point to intersect with the output impedance curve of the driver (point "A"). In this case, the output voltage initially pulls down to about 0.9V and approximately an 80 ma. current waveform is sent down the transmission line. In this discussion, current polarities are defined such that current flowing down the transmission line from the receiver to the driver is positive. Voltages are referenced to ground in a conventional manner.

That same transition can be viewed in FIG. 8B if the drawing is turned on its side. Each square along the "t" (time) axis represents one trip of a waveform down or back up the transmission line. So first the output voltage drops to the voltage of point "A" and then one transmission time later (one square), the receiving end begins to change.

The equilibrium point (balance between the waveform arriving at the receiving end and the load impedance) at the receiving end can be derived by drawing a −50 Ohm impedance line from point "A" to intersect with the impedance curve of the receiving gate. So at the receiving end, the driving end transition from 5 Volts to 0.9V will be seen as a transition from 5V to −2.5V (point "B"), causing another reflection which is sent back toward the driving end. Drawing another 50 Ohm transmission line to intersect once more with the driving end at point "C" shows that it is expected to see the output of the driver driven to about −0.3V with another current wave being send down the line to the receiving end. Each of these transitions is shown on the drawing of FIG. 8B at the appropriate time interval.

When the reflection from the output (point "C") gets back to the receiving end (point "D") a problem arises because the new reflection takes the receiving end up into 0.9V range (point "D"), exceeding the worst case noise level of the receiving device and possibly causing an erroneous signal. This can cause the receiving device to misinterpret the input voltage and generate erroneous data.

Figure 9:
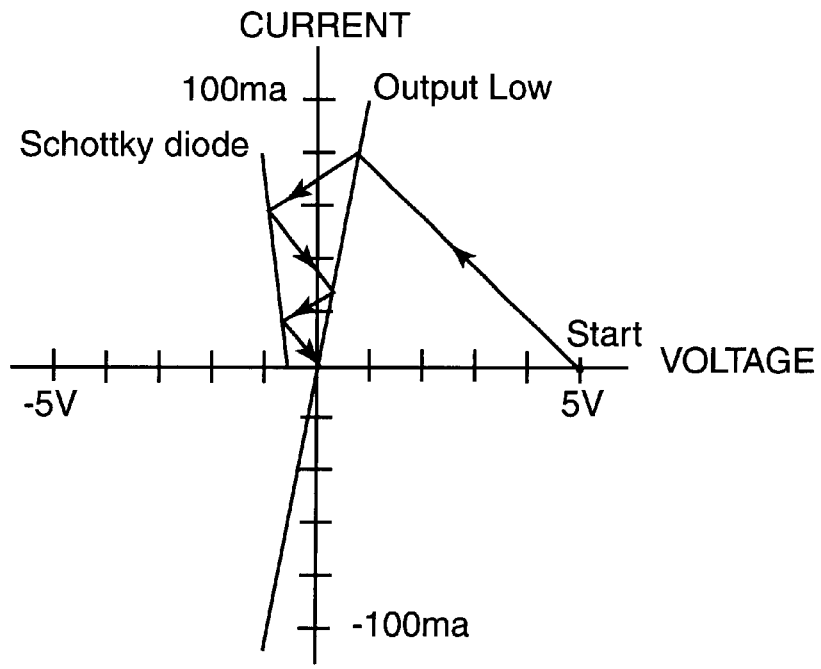
FIG. 9 is a voltage-current diagram showing the response of the transmission system when the input characteristics of the transmission system is supplemented with a Schottky diode device disposed in parallel.

Referring now to FIG. 9, the normal input characteristics of the receiving device have been supplemented by placing a Schottky diode in parallel with it. Notice that while the current waveform in the first transition is the same as in FIG. 8A, the clamping action of the diode changes the equilibrium point at the receiving end so that the input voltage does not go unduly negative, and hence the energy reflected back down the line is reduced. This ultimately leads to the situation where the receiving device never sees the damaging positive reflection of the previous example.

Figure 10:
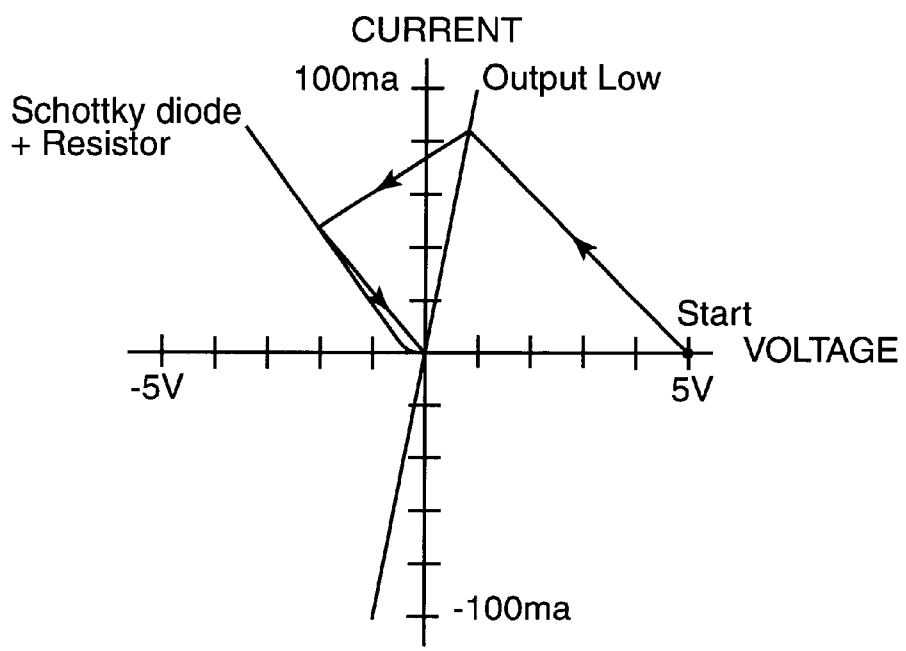
FIG. 10 is a voltage-current diagram showing the response of the transmission system of FIG. 9 when a resistor is inserted in series with the Schottky diode device.

FIG. 10 represents a special case of the situation in FIG. 9 in which a resistor is inserted in series with the Schottky diode. The resistor value is selected to be such that the equivalent impedance at the point of equilibrium is chosen to exactly match the 50 Ohm transmission line. In this situation, the current reflected back down the transmission line from the receiving end is exactly the amount necessary to settle the transmission line in one reflection.

Irrespective whether this approach is a practical alternative in a real life situation (which would require that the full characteristics of both the driver and transmission line be understood), it is realized from the above analysis that if the combined characteristic impedance of the devices on the receiving line outside of the operating range is greater than the transmission line impedance at the point of equilibrium, the system will sustain reflections that ultimately cause a positive reflection into the operating range of the device and possibly cause noise problems. On the other hand, if the combined characteristic impedance at the receiving end at the equilibrium point is lower than that of the transmission line, no positive reflections will result. Further, the closer the match between the transmission line and the termination at the point of equilibrium, the faster the system will settle.

There are, however, other issues to consider. First, the equilibrium point is a function of all the conditions that went before it, especially the initial starting voltage of the system. But perhaps more importantly, the effective impedance of the diode varies with current. And since the operating range of the Schottky diode below 0.5V shows an extremely high equivalent impedance, equilibrium points in that region will cause undesirable reflections.

Figure 11:
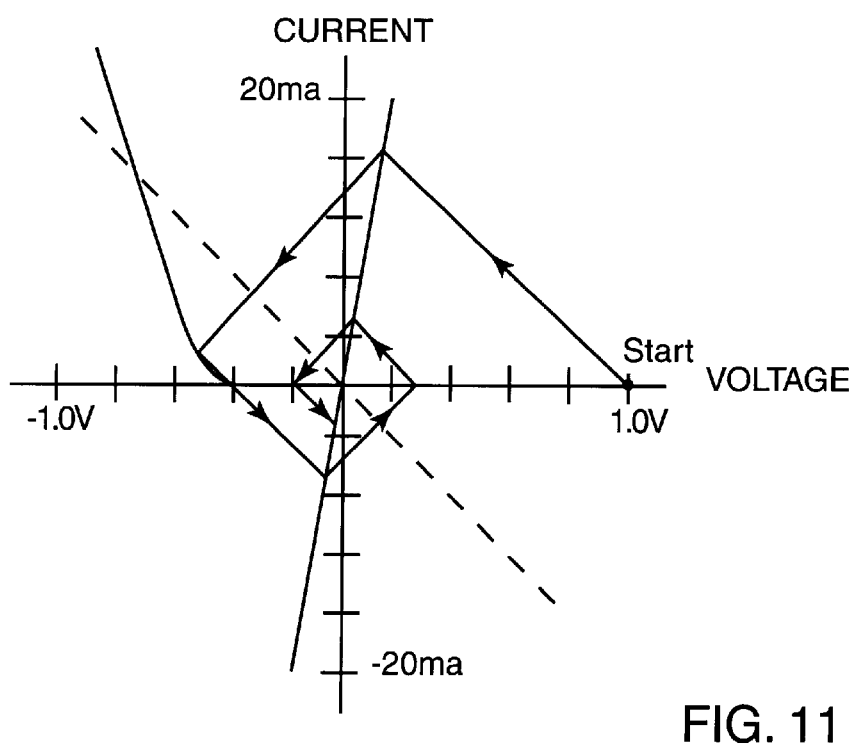
FIG. 11 is a voltage-current diagram showing the response of the transmission system when the operating voltage is dropped to about 1 volt to facilitate discussion of the reflection problems.

FIG. 11 demonstrates the point. In this case the operating voltage has been dropped to 1 volt (3 volt operation is about the crossover point for the effectiveness of Schottky diodes). In this case, the equilibrium point at the receiving end of the transmission line occurs in the high equivalent impedance region of the diode, leading to a proportionately high level of reflection back down the transmission line. Such a situation could be catastrophic, as shown. Because the diode impedance is so high in the low voltage region, the reflection problems are proportionately higher than they were back in the days of TTL circuits before the introduction of clamping diodes.

Because of the reflection problems associated with diode-based solutions, particularly at lower voltages, designers are now moving toward resistor terminated systems again. But this comes at the expense of a lot of power dissipation, which is particularly important in portable or other small systems. Getting precise termination is also difficult to engineer at the board level, especially in situations where the bus lines in question might involve sockets with varying numbers of loads which change the effective impedance.

Figure 12:
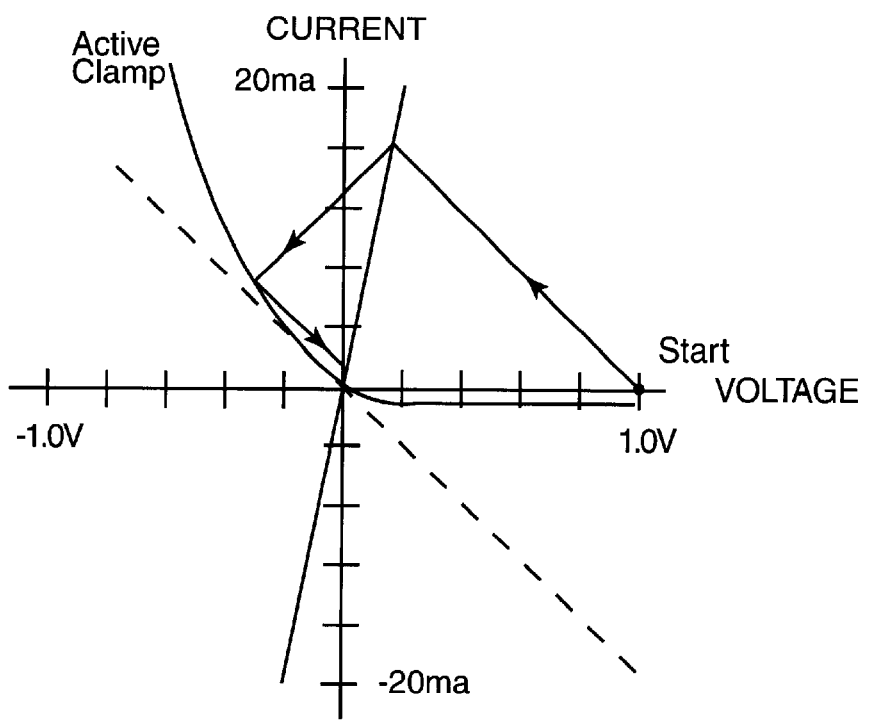
FIG. 12 is a voltage-current diagram showing the response of the transmission system when a "Zero Threshold" transistor or one having a slightly negative threshold is employed for termination.
Figure 13:
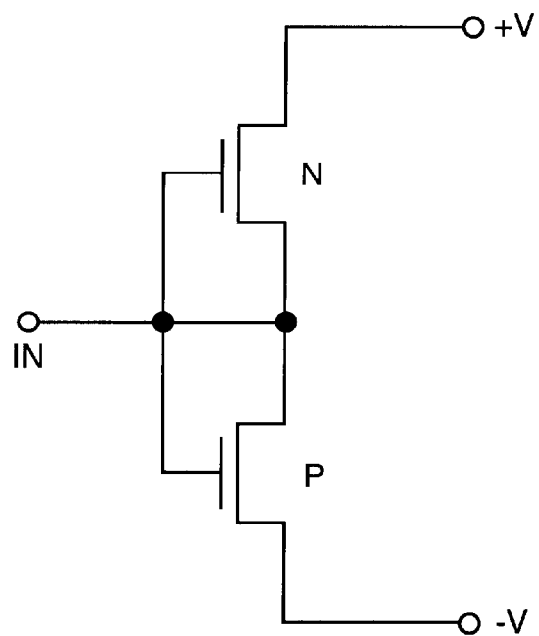
FIG. 13 depicts, in a generalized manner, a termination device wherein a "Zero Threshold" transistor or one having a slightly negative threshold is employed for termination.

FIG. 12 demonstrates a new kind of termination which has the low power benefits of the diode termination and still works at low voltages. In it, a "Zero Threshold" transistor, or more likely even one with a slightly negative threshold is used for termination. See FIG. 13 for the diagram. Within the active region of bus operation, these devices may be somewhat conductive, perhaps as much as 1 or 2 ma. However, compared to the 20 ma. or more of current that a terminating resistor would normally consume in this example, this is extremely low. As soon as the transmission line voltage reflects outside of the operating range, however, the zero threshold device turns on and provides a much softer turn-on.

Such systems save a lot of power. Further, they could eventually be integrated into the ICs themselves with, in some cases, two additional implants and masking steps. Additionally, diode terminations are extremely useful in applications such as memory buses where a variable number of cards might be inserted onto the memory bus. It is very difficult to determine the correct termination impedance in such applications and the diode class of solution is essentially self tuning. If other receiving devices do more clamping/terminating, the diode comes into play less. It is also less sensitive to the exact characteristic impedance of the transmission line. Further, freed from the necessity to terminate in a power consuming resistor network, chip designers can use smaller drive circuits because of reduced load, and use full rail voltage swings to get greater inherent noise margins.

The one negative of the diode type of termination is that it is an "nT" class of terminator, where n is the number of bus transition required before the bus is sufficiently stable for further action to proceed. A parallel termination is a 1T type of terminator in that all points of the transmission line are terminated correctly and no reflections are allowed. A series termination is a 2T terminator in that it relies on a half height wave propagating down a transmission line, being doubled, and then reflecting back to the source end to compete the setting. In both cases that is the theory, but usually impreciseness in the termination requires more settling than this.

To a first order approximation, the diode is a 3+T terminator which requires a waveform to propagate down the transmission line, be reflected back to the source, and then be subsequently reflected back to the receiving end before the bus is effectively settled. So in situations where the operating frequency of the bus is high relative compared to the length of the bus, the bus may not be fully settled when the next transition occurs. Under such circumstances, the line voltage could be slightly different from transition to transition giving rise to apparent edge jitter in the signal. This occurs because the output may have a little more or less voltage to transition from one cycle to another. While in today's systems with fast rise and fall times, this is probably not more than a couple tenths of a nanosecond, it is something that must be considered in any case.

One advantageous application for this terminator may be found on memory buses such as those used on the SDRAM, where the loading characteristics vary depending on the number of devices inserted, and where the voltage swings are likely to be high for the standard parts. However, if bus lengths are not too long relative to the operating frequency and edge jitter is not important, it would be applicable in almost any sort of system.

However, there is a problem in implementation. If the threshold of the "zero threshold" device is very close to zero volts, there is less of a concern. However, the region of concern is in the area 0V to 3 Volts. The normal variation of threshold in a CMOS process can be +/−0.2V. The implication is that depending on process variation, the diode can be anywhere from non-conducting to heavy conduction within the operating range. This would be unacceptable in many applications.

Figure 14:
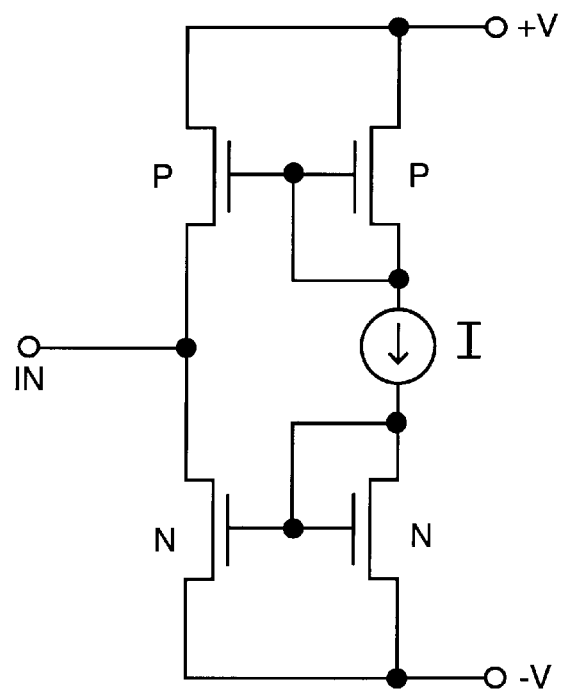
FIG. 14 illustrates, in accordance with one embodiment of the present invention, an improved termination circuit.

FIG. 14 shows a circuit solution to this problem. In this case, the gate of the clamping transistors is not connected to the power supply rail, but rather to a reference voltage which is designed to track the variations in threshold voltage. So if the threshold voltage is on the high side, the gate node is biased higher. If the threshold voltage is lower, the gate is biased lower. As a result, when voltage on the clamp reaches one of the rail voltages, the transistor is properly biased to provide the proper impedance characteristics and behaves like a zero threshold device. There will be some conduction through the clamping transistors, but as discussed before, this will be very small compared to the current which would be utilized if a resistor termination were used.

Figure 15:
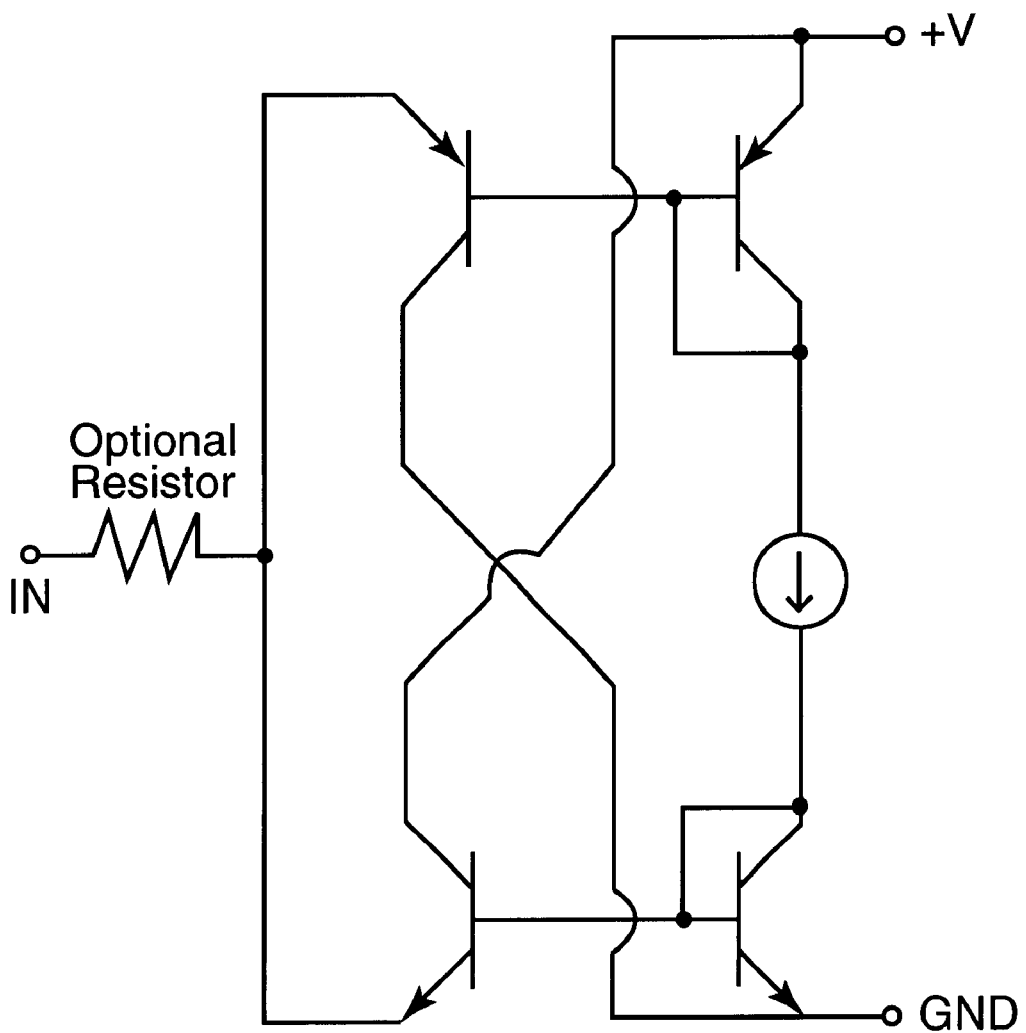
FIG. 15 illustrates, in accordance with still one embodiment of the present invention, an improved termination circuit which improves the settling time.

FIG. 15 illustrates a bipolar implementation of the inventive termination circuit. In FIG. 15, the clamping transistor is biased so that it will be non-conducting in the normal active range of the bus, but provides a clamping action outside of the power supply range. In some cases, the bipolar circuit may have an even lower effective impedance than the MOS devices.

This could be utilized in either of two ways. First, for some applications, the lower clamp voltage might be desirable. But, in other cases, it might be desirable to include the optional series resistor shown in FIG. 15 to provide an impedance which more readily settles the transmission line. When used with low voltage systems (2.5V or less), the initial undershoot voltage may be on the order of −0.75 Volts. Such a magnitude of voltage would not significantly forward bias the substrate diode of the receiving device which, if it happened, would cause stored charge problems. With the resistor the line would then settle almost immediately. For lower supply voltages, there would be no concern about the magnitude of undershoot. The bipolar system might be suitable for such a system. This bipolar system also has the advantage in that there would be no bias current through the output devices when the operating level of the transmission line is inside the limits of the power supply.

Finally, there is an exact equivalent of the bipolar circuit which could be made using CMOS technology. For inclusion of the clamp on an integrated circuit this would be a suitable alternative, and would likely closely approach the performance of the bipolar device. It also would have substantially no current drain within the operating range.

There are two potential advantageous applications of these clamps. One is as a separate device (e.g., a discrete Quarter Size Small Outline Package, or QSOP, device) for use in systems where the original devices do not already have such clamping circuits. Alternatively, one would expect this class of clamps to be added to every CMOS integrated circuit manufactured.

ADDITIONAL EMBODIMENTS OF THE INVENTION

Figure 16:
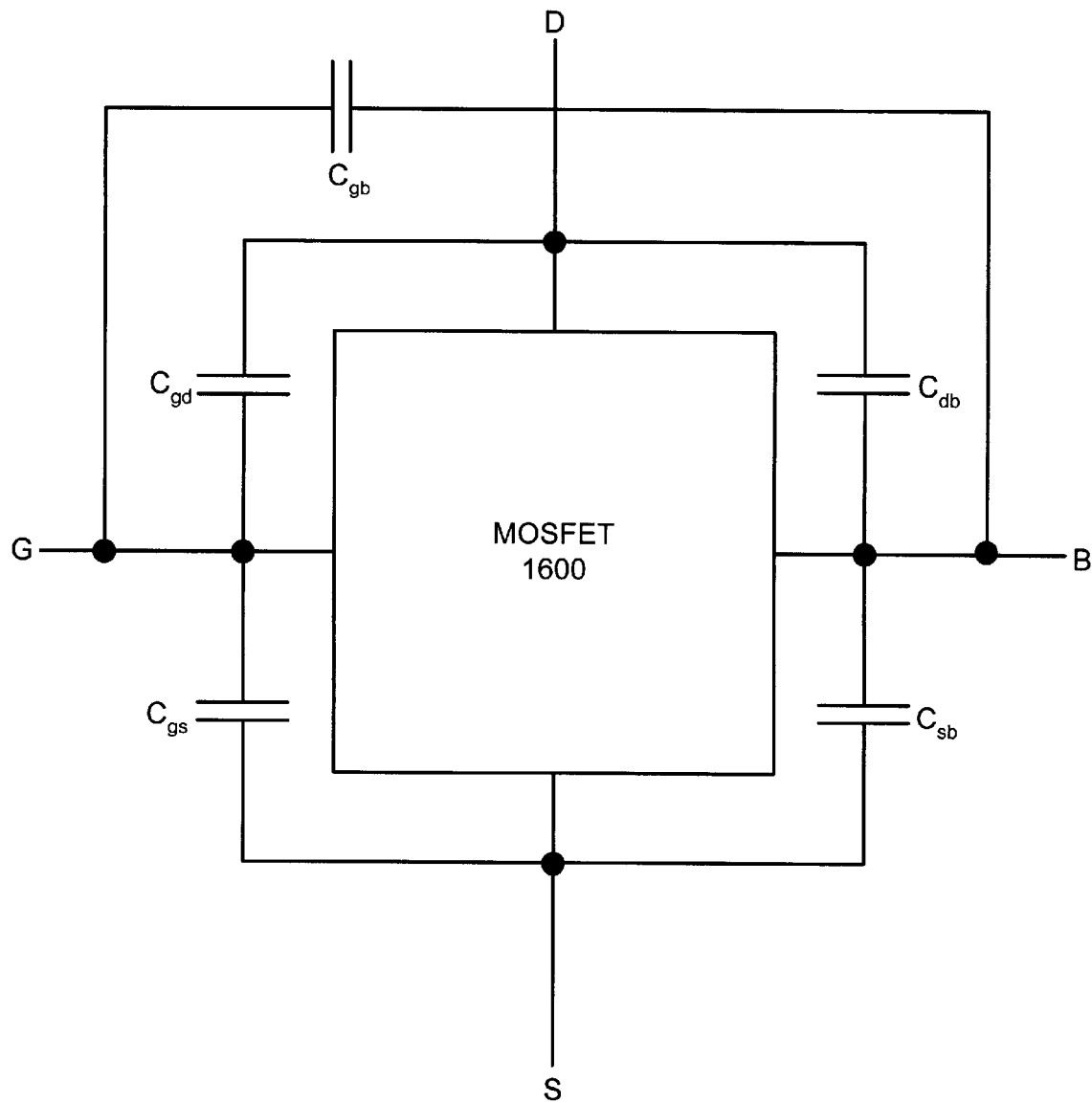
FIG. 16 illustrates a typical MOSFET 1600 having associated junction parasitic capacitances represented as lumped elements between the device terminals.

As well known in the art, all junction type devices (including transistors) have intrinsic capacitance loading between the various junctions commonly referred to as parasitic capacitance. One such parasitic component particularly relevant to the inventive termination circuit are referred to as MOSFET capacitances. These parasitic components are mainly responsible for the intrinsic delay of logic gates. FIG. 16 illustrates a typical MOSFET 1600 having associated junction parasitic capacitances represented as lumped elements between the device terminals. Based on their physical origins, the parasitic device capacitances can be classified into two major groups: (1) oxide-related capacitances and (2) junction capacitances. In the example shown, the gate-oxide-related capacitances are Cgd (gate-to-drain capacitance), Cgs (gate-to-source capacitance), and Cgb (gate-to-substrate capacitance). It is well known in the art that the gate-to-channel capacitance is distributed and voltage dependent, and consequently, all of the oxide-related capacitances described here changes with the bias conditions of the transistor. Note that the total gate oxide capacitance is mainly determined by the parallel-plate capacitance between the gate and the underlying structures. Hence, the magnitude of the oxide-related capacitances is very closely related to (1) the gate oxide thickness, and (2) the area of the MOSFET gate.

Typically, the gate to drain parasitic capacitance $C_{gd1}$ (associated with transistor 332) and $C_{gd2}$ (associated with transistor 320) degrade the clamping performance of the termination circuit 300 by causing the gate voltages of the clamping transistors 332 and 320 to vary in relation to the input voltage rise or fall on the transmission line 306. In some cases, this variation in gate voltage can be as high as approximately 200 mV. However, by including the stabilizing capacitors 1702 and 1704, the change in gate voltage can be reduced to approximately 50 mV.

Figure 17:
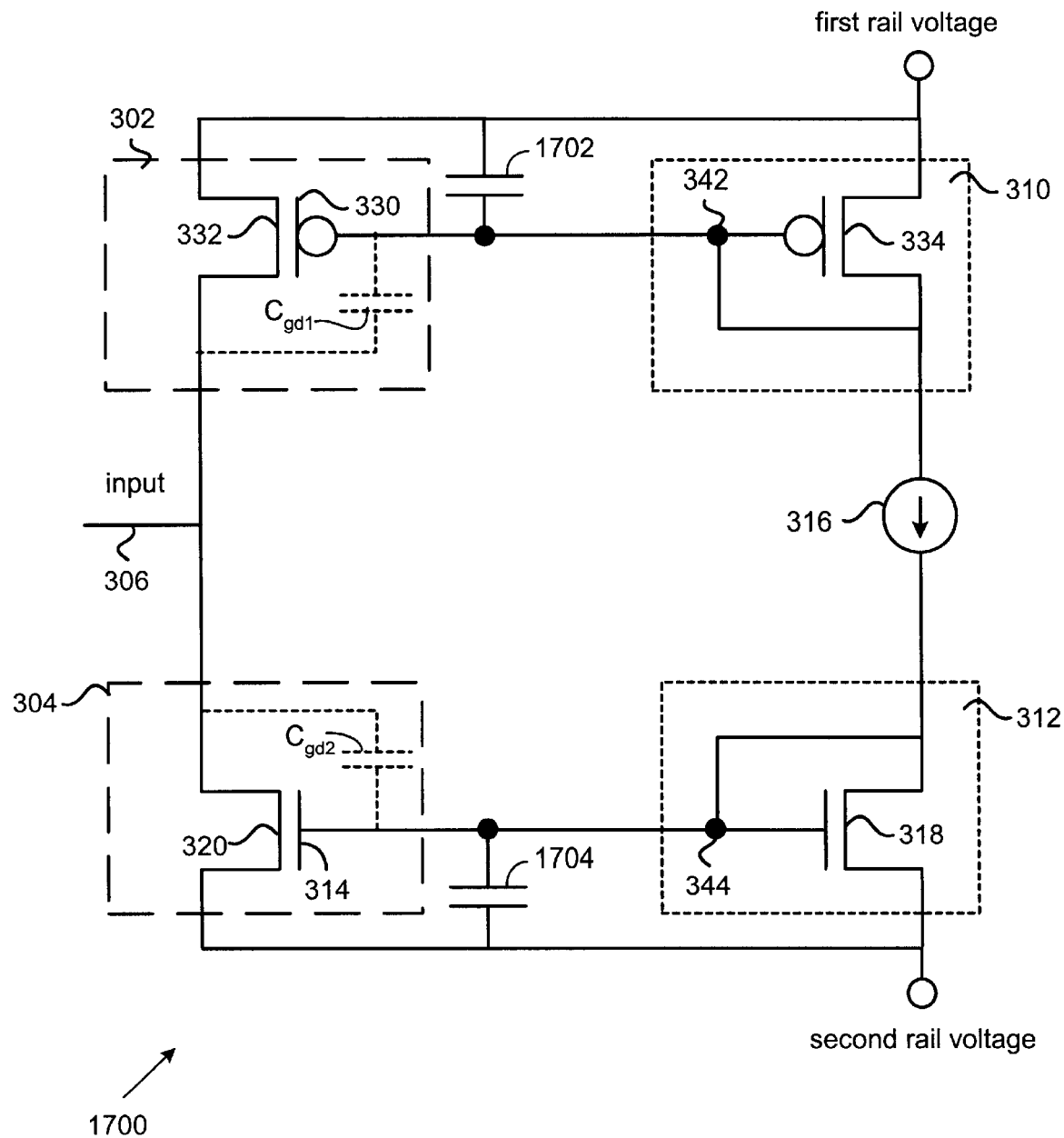
FIG. 17 illustrates a termination circuit having stabilizing capacitors in accordance with an embodiment of the invention.

With this in mind, FIG. 17 illustrates a termination circuit 1700 having stabilizing capacitors 1702 and 1704 in accordance with an embodiment of the invention. In the described embodiment, the stabilizing capacitors 1702 and 1704 are used to compensate for the gate-oxide parasitic capacitances. It should be noted that the termination circuit 1700 is one potential embodiment of the termination circuit 300 shown in FIG. 3 and should therefore not be considered to be limiting either the scope or intent of the invention.

As shown in FIG. 17, termination circuit 1700 includes the top active clamping device 302 and the bottom active clamping device 304. In the embodiment of FIG. 17, top active clamping device 302 is implemented by the p-channel MOS device 332 (having a gate to drain parasitic capacitance $C_{gd2}$) having its source connected to a second potential that serves to clamp the signal on a transmission line 306 at about the second reference voltage (e.g., $V_{DD}$). On the other hand, bottom active clamping device 304 is implemented by the n-channel MOS device 320 (having a gate to drain parasitic capacitance $C_{gd2}$) having its source connected to a first potential and serves to clamp the signal on transmission line 306 at a first reference voltage (e.g., ground or GND). It should be noted that even though the inventive clamping circuit is described in terms of MOS devices, one of ordinary skill in the art can appreciate that other appropriate devices, such as bipolar can also be used.

Figure 18:
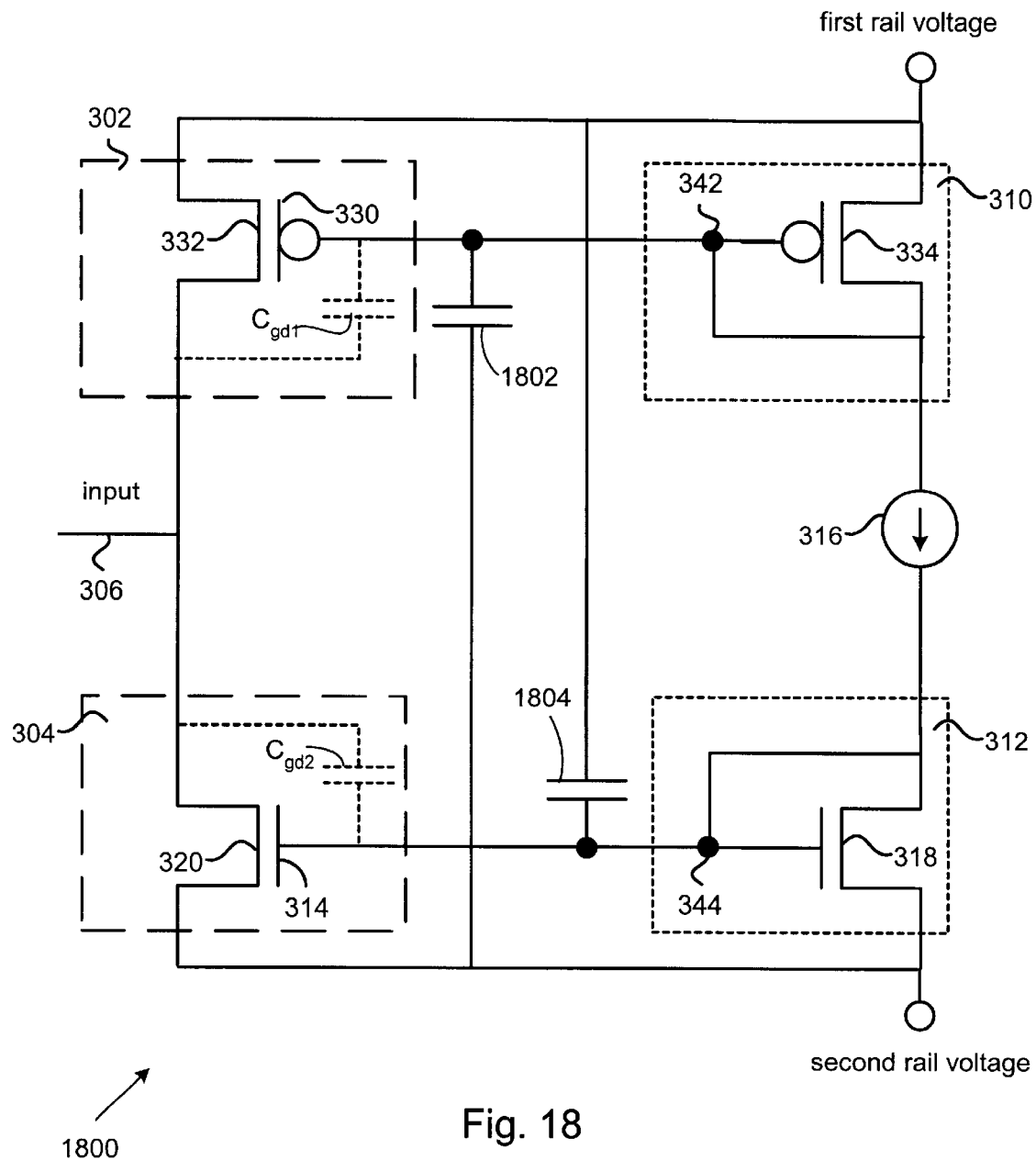
FIGS. 18 and 19 illustrate other embodiments of the termination circuit shown in FIG. 17.
Figure 19:
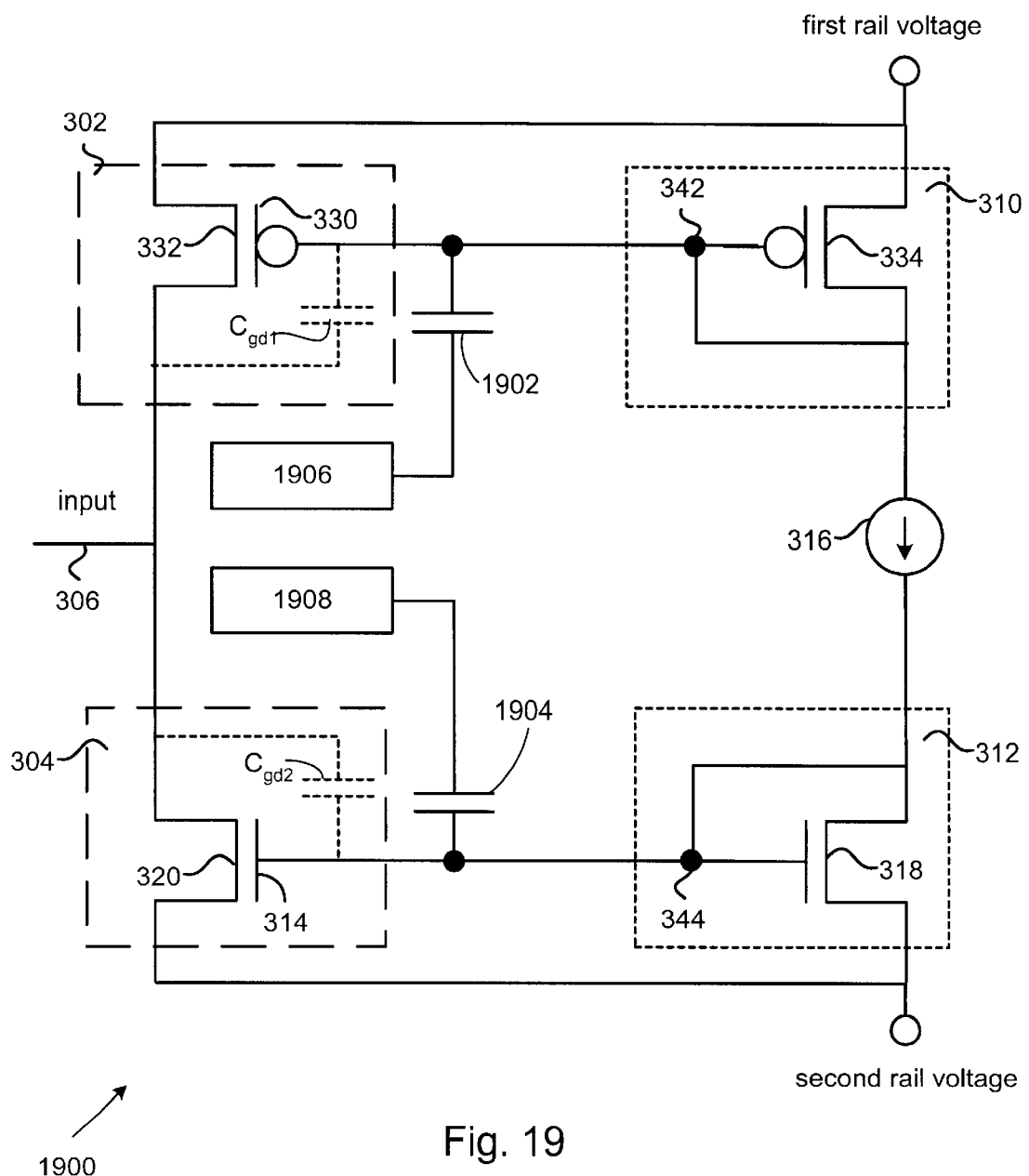

For the remainder of this discussion, the second potential is assumed to be $V_{DD}$ and the first potential is GND. However, it should be noted that these labels are for the sake of this discussion only and should not be considered to be limiting either the scope or breadth of the invention. In this example, therefore, the source of MOS device 332 is coupled to $V_{DD}$ while the source of MOS device 320 is coupled to ground. The drains of devices 332 and 320 are both coupled to transmission line 306 as shown. Referring now to bottom active clamping device 304, the gate 314 of MOS device 320 is coupled to both the gate and drain of the bottom threshold reference device 312. In order to compensate for any parasitic capacitance induced changes in transistor gate voltage for the MOS device 320, the stabilizing capacitor 1704 couples the gate 314 to any suitable stable voltage supply such as a first reference voltage supply. It should be noted, however, that any suitably stable voltage supply can be used as illustrated in FIGS. 18 and 19. By coupling the gates 330 and 314 to a suitable stable voltage supply (which in this example is $V_{DD}$ and GND, respectively), any change in clamping transistor gate voltage due to a voltage transition caused by either the parasitic capacitances $C_{gd1}$ and $C_{gd2}$ is substantially reduced over those termination circuits not having capacitors 1702 and 1704.

For example, when a signal on transmission line 306 begins to transition from a HIGH signal, or logic 1 (approximately VDD ) to a logic 0 (approximately GND), the stabilizing capacitor 1704 acts as to reduce the transient voltage decrease on the gate 314 thereby maintaining the gate 314 of the n-channel MOS device 320 at substantially $V_T$. When the signal on transmission line 306 begins to reflect and dips below ground, (i.e., as soon as the potential difference between the gate of n-channel MOS device 320 of bottom active clamping device 304 and its source exceeds $V_T$) n-channel device 320 begins to conduct and to source current from its drain, which is connected to ground as shown in FIG. 17. Accordingly, the signal at 306 is clamped at approximately ground.

Similarly, when the signal on transmission line 306 begins to transition from a LOW signal, or logic 0 (approximately GND) to a logic 1 (approximately VDD), the stabilizing capacitor 1702 acts to reduce the voltage transient on the gate 330 thereby maintaining the gate 330 of the p-channel MOS device 332 at substantially $V_{DD}-V_T$. When the signal on transmission line 306 begins to reflect and rises above $V_{DD}$, p-channel MOS device 332 turns on to clamp this signal at about $V_{DD}$. Accordingly, the signal at 306 is clamped at approximately VDD.

FIGS. 18 and 19 illustrate additional embodiments of the termination circuit 1700 in accordance with an embodiment of the invention. It should be noted that the stabilizing capacitors can couple the gates 330 and 314 of the transistors 332 and 320 to any appropriately stable and suitable voltage source. For example, in FIG. 18, the termination circuit 1800 has stabilizing capacitors 1802 and 1804 coupling the gates 330 and 314 to GND and VDD, respectively, whereas in FIG. 19, the stabilizing capacitors 1902 and 1904 couple the gates 330 and 314 to a discrete stable voltage supply circuit 1906 and 1908, respectively. It should be noted that the discrete stable voltage supply circuits 1906 and 1908 can be, in some cases, the same or substantially the same circuits.

Figure 20:
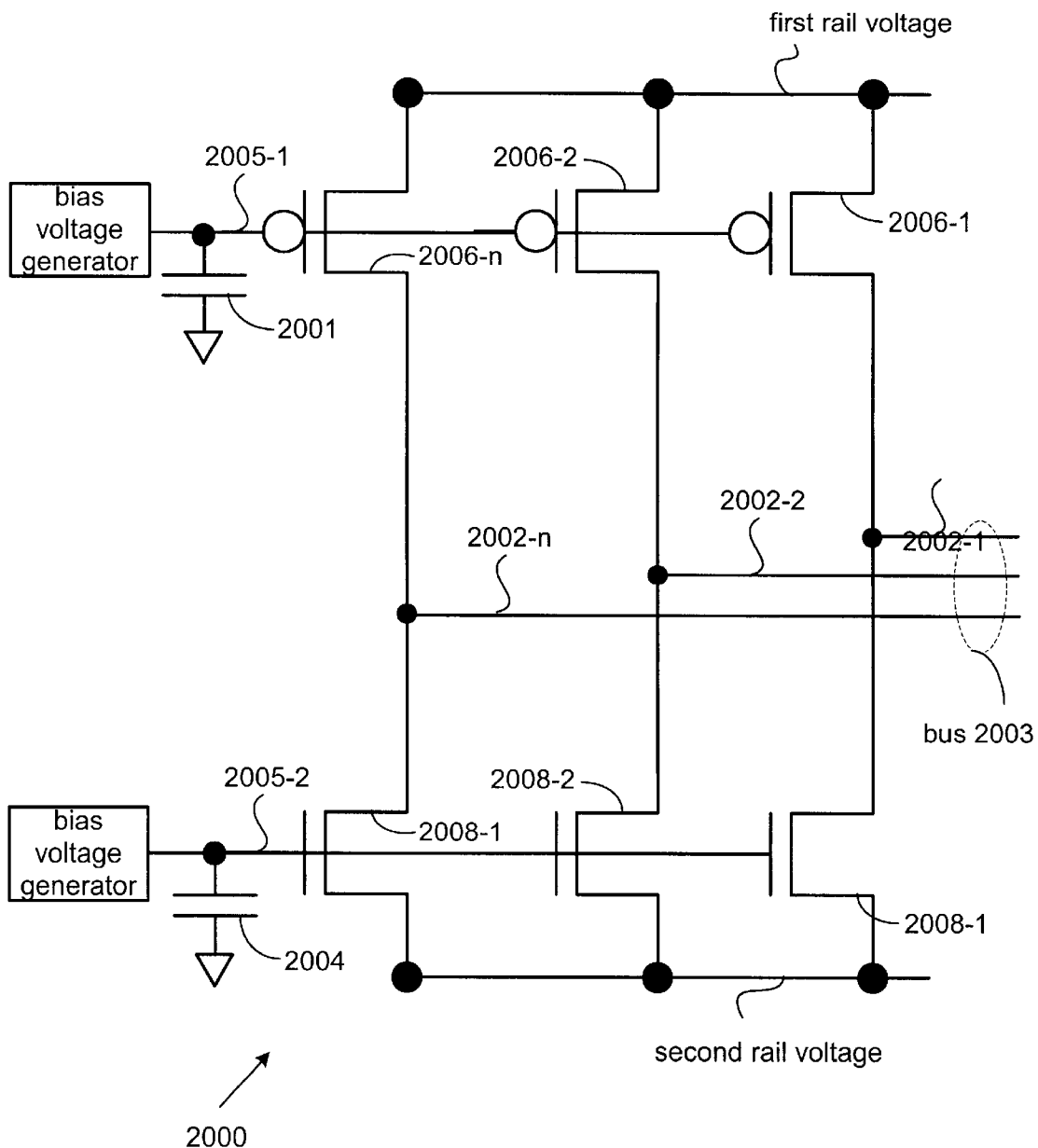
FIG. 20 shows a bus termination circuit in accordance with an embodiment of the invention.

In some cases, the transmission line to be clamped is one of a plurality of transmission lines typical of a bus, such as a data bus, address bus, memory bus etc. Such a situation is illustrated in FIG. 20 showing a bus termination circuit 2000 in accordance with an embodiment of the invention. In the described embodiment, the bus termination circuit 2000 is suitably arranged to terminate a plurality of transmission lines 2002-1 through 2002-n that taken together form a bus 2003. In the situation shown in FIG. 20, a first stabilizing capacitor 2001 that is coupled to the second reference voltage supply and a first shared line 2005-1 that is in turn coupled to each gate of a plurality of top clamping transistors 2006-1 through 2006-n (each having their sources connected to second potential). The circuit 2000 also includes a second stabilizing capacitor 2004 that is coupled to the first reference voltage supply and a second shared line 2005-2 that is in turn coupled to each gate of a plurality of bottom clamping transistors 2008-1 through 2008-n (each having their sources connected to the first potential) In this way, each of the plurality of the transmission lines 2002-1 through 2002-n that form the bus 2003 are individually clamped by their respective top and bottom clamping transistors. For example, the transmission line 2002-1 is clamped to VDD (assuming that the second reference voltage is VDD, of course) by way of the top clamping transistor 2006-1 and is clamped to GND (assuming that the first reference voltage is GND, of course) by way of the bottom clamping transistor 2008-1. It should be noted, that in the arrangement described in FIG. 20, the stabilizing capacitors 2001 and 2004 must be large enough to be able to compensate for parasitic capacitances present in all of the clamping transistors. In some situations, this may present difficulties since a capacitor capable of adequate compensation may be too large for a particular application.

Figure 21:
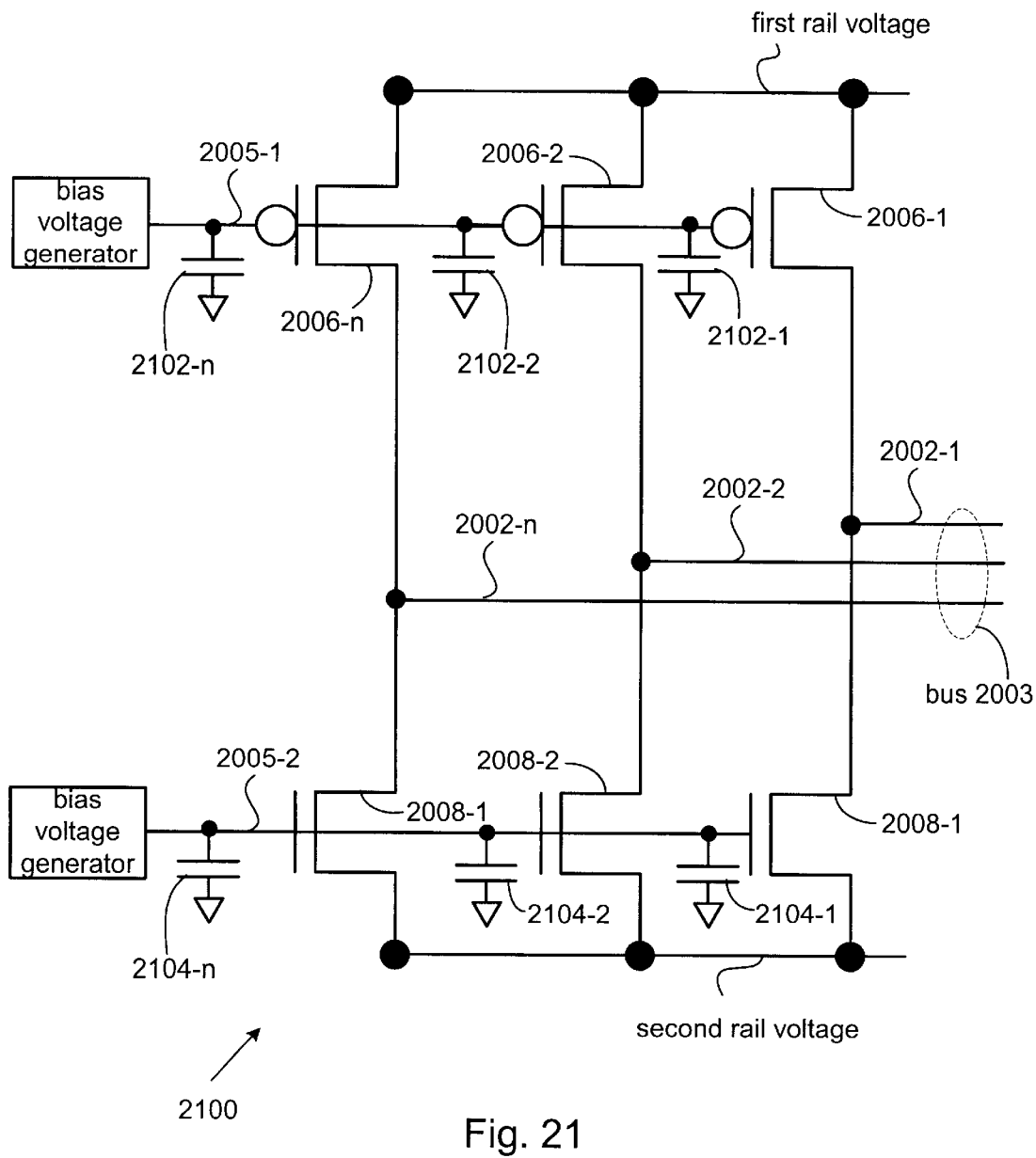
FIG. 21 illustrates a variation of the bus termination circuit shown in FIG. 20 where each of the clamping have their own compensating capacitor.

In those cases, FIG. 21 illustrates a variation of the bus termination circuit 2000 where each of the clamping transistors 2006-1,n and 2008-1,n have their own compensating capacitor. More particularly, a bus termination circuit 2100 shown in FIG. 21 is one embodiment of the bus termination circuit 2000 shown in FIG. 20 except for the fact that instead of a single compensating capacitor 2001 and 2004, each of the plurality of top clamping transistors 2006-1 through 2006-n and bottom clamping transistors 2008-1 through 2008-n have an associated stabilizing capacitor 2102-1,n and 2104-1,n, respectively, directly connected to a corresponding transistor gate. In this way, the size of each of the capacitors 2102-1,n and 2104-1,n is substantially smaller than 2001 and 2004 since each is only compensating for a single gate node. It is noted that an isolating resistor or inductor can be coupled to each of the gates of the clamping transistors.

Figure 22:
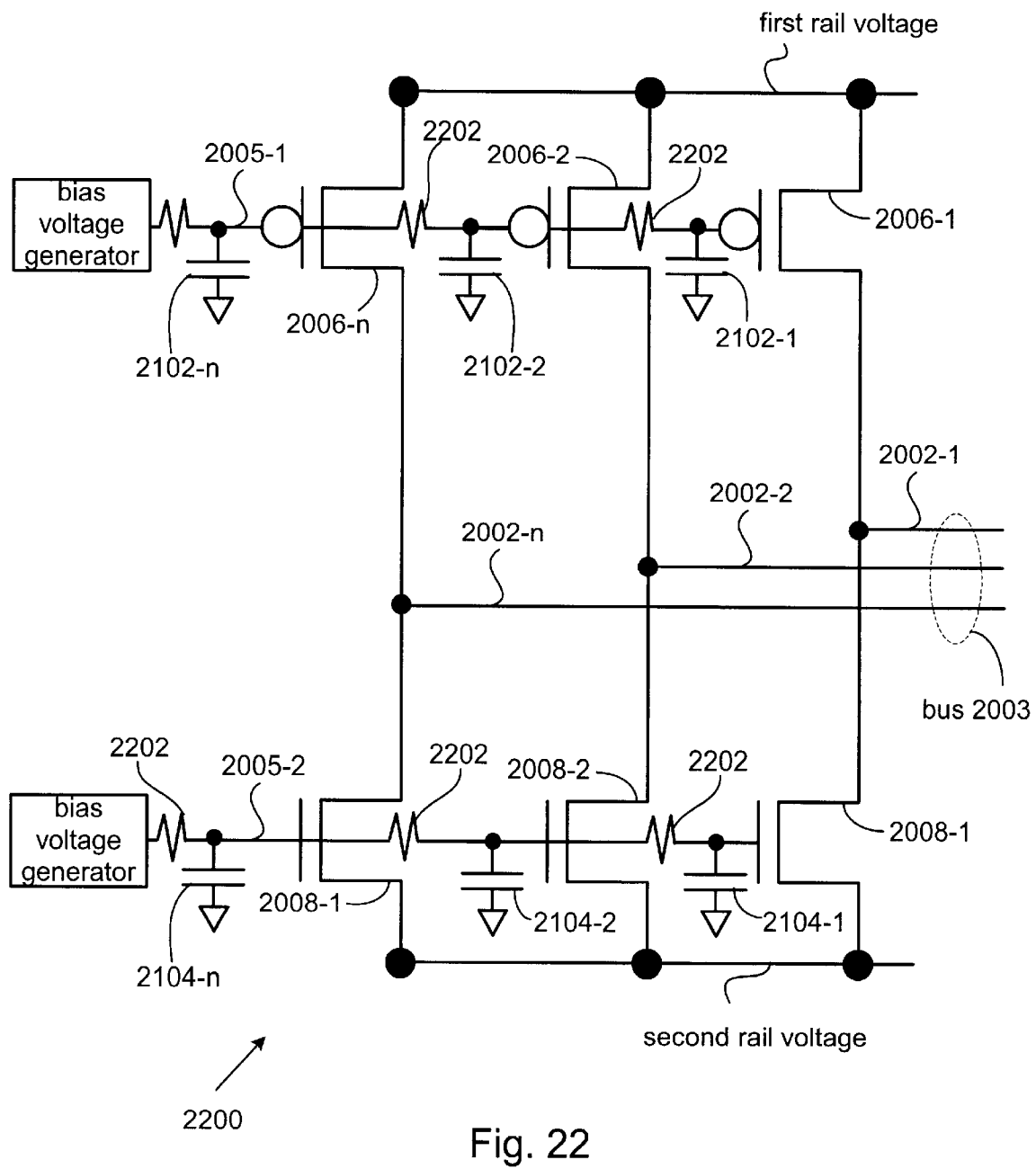
FIG. 22 shows a bus termination circuit having an isolating resistor directly connected to each of the stabilizing capacitors.

In another embodiment, a bus termination circuit 2200 shown in FIG. 22, has a first isolating resistor 2202-1,n directly connected to an associated one of the capacitors 2102-1,n and a second isolating resistor 2204-1,n directly connected to an associated one of the capacitors 2104-1,n. By adding such resistors, the bus termination circuit 2200 is capable of isolating each of the clamping transistors 2006 and 2008 from one another so as to reduce, or substantially eliminate, cross-talk between the various transmission lines well known to those skilled in the art. It should be noted that inductors can also be used in place of the resistors. It should also be noted that a connecting track within an IC will have resistance and inductance and can also be used in place of the resistors.

Figure 23A:
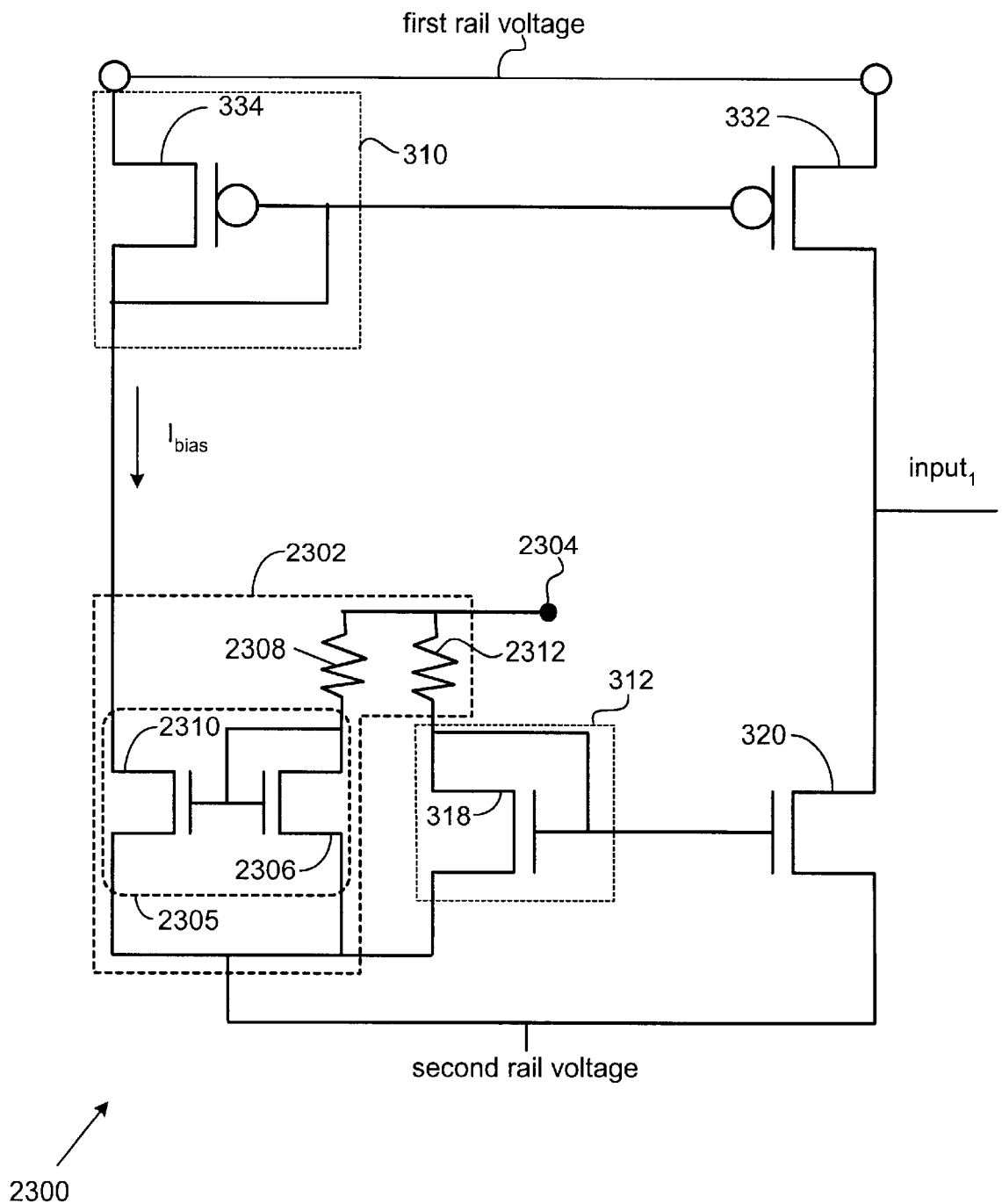
FIGS. 23A and 23B show a particular implementations of a variable current source (VCS) termination circuit in accordance with an embodiment of the invention.

In some situations it may be desirable to provide a variable current supply to the threshold reference devices 310 and 312. Such situations include those requiring a lower DC power consumption by the termination circuit 300 or in those circuits or systems where a power down mode is desirable. With this in mind, FIG. 23A shows a particular implementation of a variable current source (VCS) termination circuit 2300 in accordance with an embodiment of the invention. It should be noted that the VCS termination circuit 2300 is but one embodiment of the termination circuit 300 shown in FIG. 3 that is suitable for circuits and/or systems where low DC power or a power down function (such as a sleep mode) is desirable. In the described embodiment, the VCS termination circuit 2300 includes a variable current source (VCS) 2302 (refer back to current source 316 of FIGS. 3 and 17) coupling the threshold reference devices 310 and 312. An enable input pin 2304 provides an enable/disable signal to the VCS 2302, the value of which determines the bias current provided to the threshold reference devices 310 and 312. In the described embodiment, the VCS 2302 includes a current mirror 2305 formed by a drain-gate coupled transistor 2306 having its drain and gate connected to a resistor 2308 and its source to the first reference voltage supply (for example GND) while its gate is coupled to the gate of a transistor 2310. In a particular implementation, the transistor 2310 has its source connected to the first reference voltage supply (e.g, GND) and its drain connected to the drain and gate of the transistor 334. In addition, the resistor 2308 is connected in parallel with a resistor 2312 that connects the drain and gate of the transistor 318 to the enable input pin 2304 such that the bias current (I) supplied by the VCS 2302 is directly related to the voltage applied by the enable input pin 2304.

For example, if the voltage on the enable input pin 2304 is increased, then the bias voltage on the gate of 320 will also increase, improving its clamping voltage. Whereas, the increase in the voltage on the enable input pin 2304 will also decrease the bias voltage to the gate of 332, thereby improving its clamping voltage. In those cases where the termination circuit 2300 is to be put into a sleep, or inactive mode, the voltage on the enable pin 2304 can be reduced to well below threshold voltage Vt in which case, there will be no DC current and thus no DC power consumed. This is also referred to as a shutdown mode typical of those circuits or systems where a sleep, or low power mode is desirable. It should be noted that there is a trade-off between clamping voltage performance and good DC power dissipation since improved clamping performance requires a higher biasing current be provided by the VCS 2302, and vice-versa.

Figure 23B:
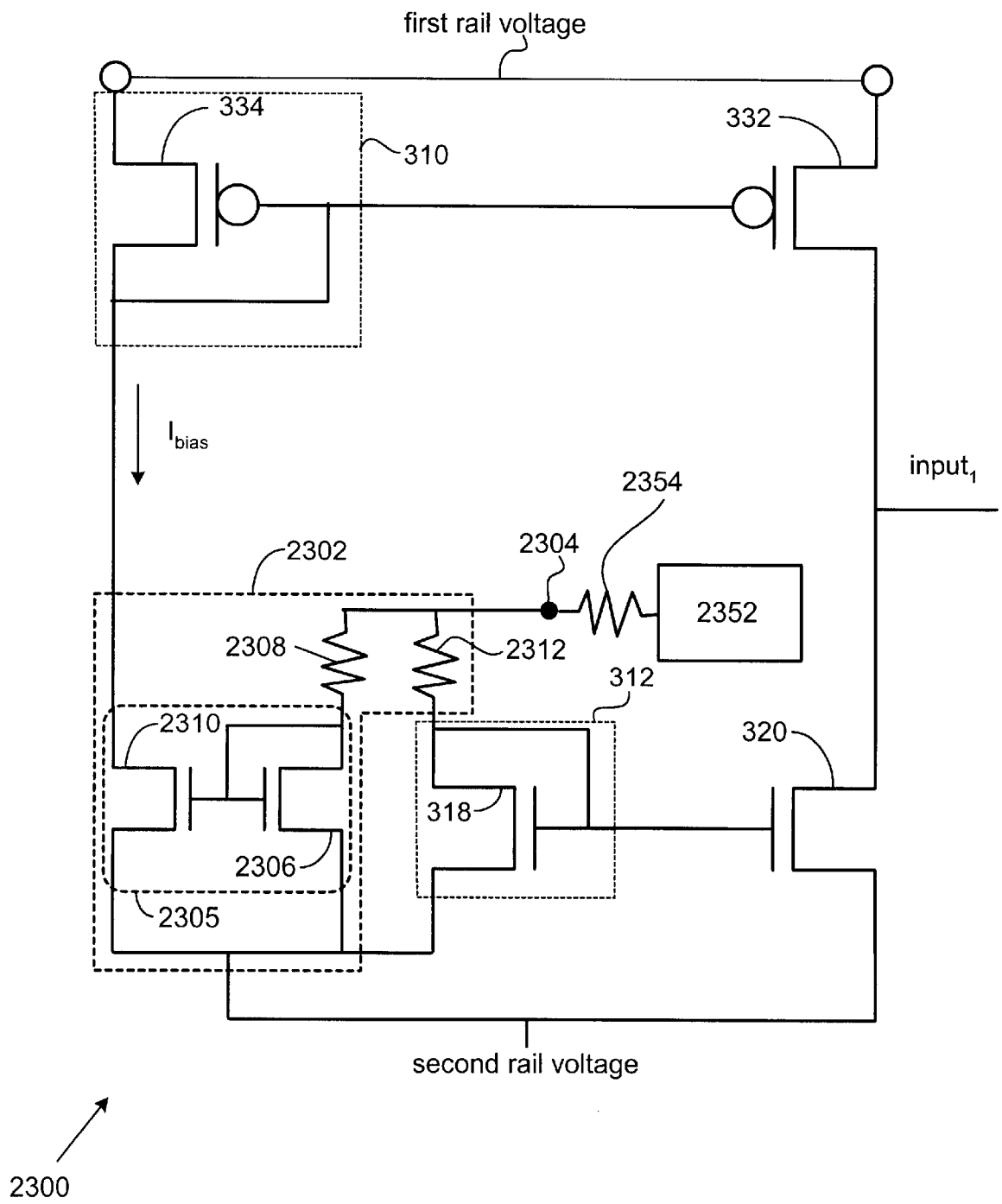

In some embodiments, the enable input pin 2304 can be controlled by a controller as with VCS termination circuit 2350 as illustrated in FIG. 23B. In the described implementation, a microprocessor unit 2352 is connected to the enable input pin 2304 by way of an external resistor 2354. In this case, a enable/disable signal generated by the microprocessor 2352 would be set at GND to de-power (i.e., disable) the VCS termination circuit 2350 and when clamping was required, the microprocessor 2352 would generate an enable signal set to VDD in which case the resistor 2354 would then determine the clamping voltage and associated DC power dissipation. For example, if the value of the resistor 2354 is increased, the DC power dissipation will be decreased (due to the reduced current drive) at the expense of poorer clamping efficiency, and vice versa.

Figure 24:
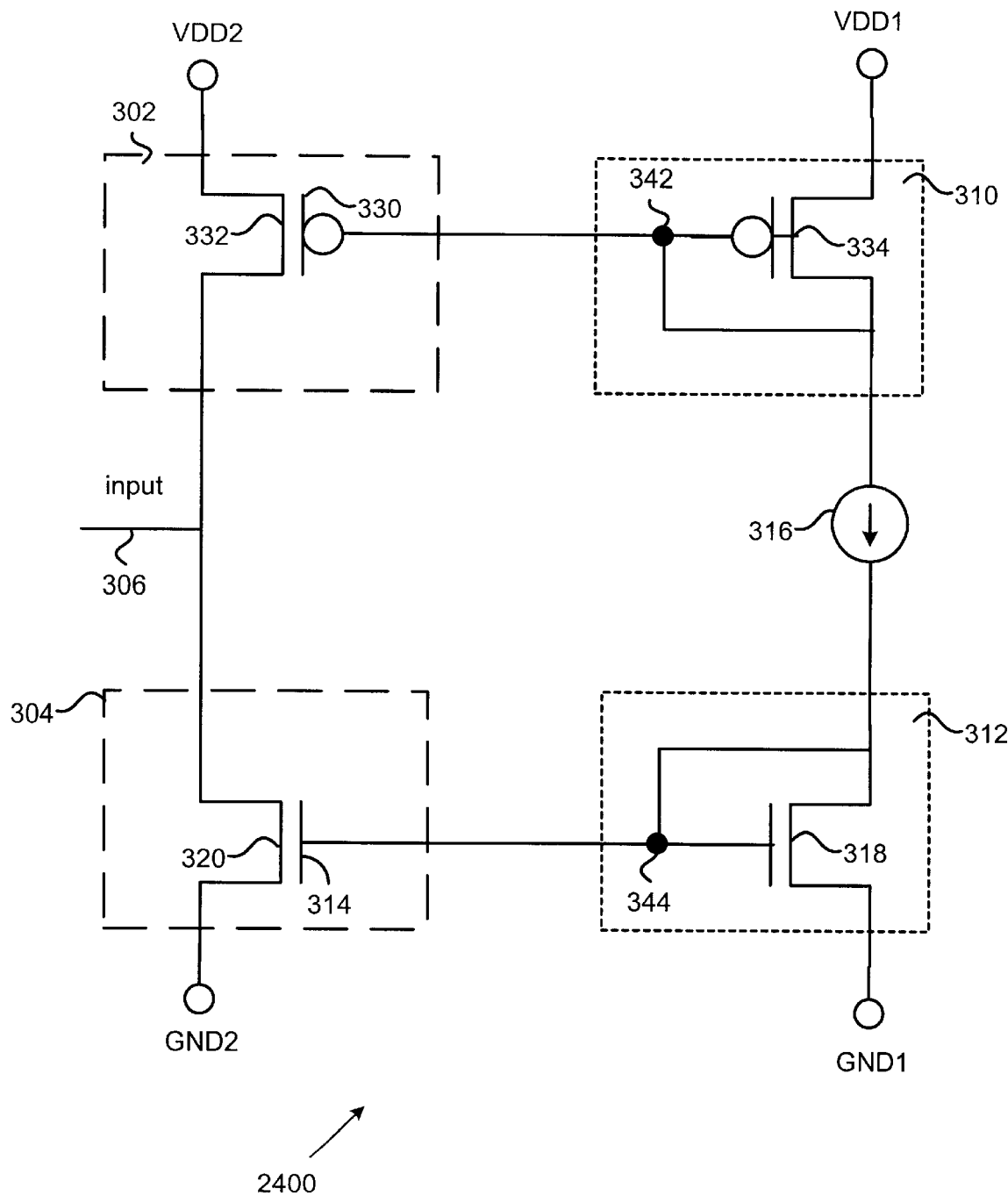
FIG. 24 illustrating a split rail type termination circuit in accordance with an embodiment of the invention.

As well known in the art, no conductor is perfect so whenever any current flows there will be small voltage drops due to the resistance of the conductor. This may cause a problem in any termination circuit where the various clamping devices and the associated bias voltage generators are coupled to the same rails. For example, if the input voltage is above VDD and the upper clamping transistor 332 is conducting, then significant current will be flowing into the VDD line. This current will cause the localized VDD voltage to rise and if the bias transistor 334 is connected to this localized VDD line, then its gate/drain voltage will also rise by the same amount thereby raising the voltage on the gate of 332. This effect is due to the fact that if the current I is constant, then the source to gate voltage of 334 must also be constant. In this situation, the rise in the gate voltage of 332 will also cause the clamping voltage to be increased by the same amount thereby reducing the efficacy of the upper clamping device 302. One approach to solving this problem is shown in FIG. 24 illustrating a split rail type termination circuit 2400 in accordance with an embodiment of the invention. As can be readily appreciated, having two independent rail lines, VDD2 and VDD1, coupled respectively to the upper clamping transistor 332 and the upper threshold reference transistor 334, any current dumped into the rail line VDD2 by the transistor 332 will not cause a voltage transient in the rail line VDD1. A similar analysis provides for an independent pair of GND rail lines, GND2 and GND1, respectively, for the bottom clamping transistor 320 and the bottom reference threshold device 318.

Therefor, increasing the number of power supply rails effectively eliminates this problem since VDD2 carries a large current and the resultant increase in VDD2 does not affect VDD1 which is used only for the bias voltage generator circuit.

Figure 25:
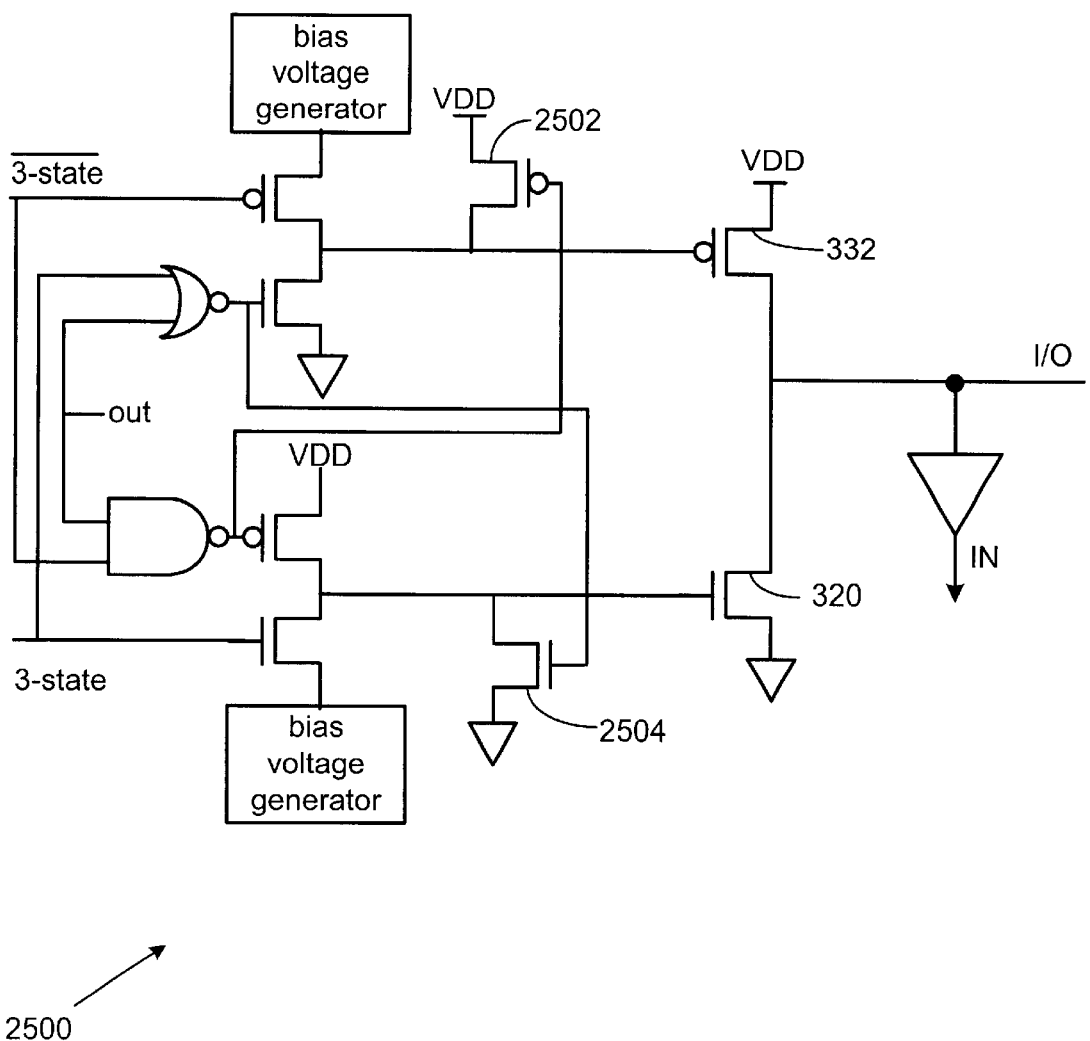
FIG. 25 illustrates a low DC power tri-state termination circuit in accordance with an embodiment of the invention.

FIGS. 25–29 illustrate various alternative implementations of the tri-state circuit 400 discussed above. One such alternative implementation is shown in FIG. 25 illustrating a low DC power tri-state termination circuit 2500 in accordance with an embodiment of the invention. The tri-state termination circuit 2500 is configured to draw a lower DC power dissipation than does the tri-state circuit 400 when the circuit 2500 is acting as an output buffer since the circuit 400 dissipates more DC power due to a totem-pole current flowing from VDD1 through transistors 320 and 332 and into GND. In order to eliminate such totem pole current, transistors 2502 and 2504 are respectively connected to the power supply rails VDD1 and GND instead of to the bias voltage generators 410 as is done in the termination circuit 400. In this way, when the output buffer is asserting a logic "0", the gate of 332 will be pulled all the way to the VDD1 rail ensuring that no current flows in 332. Similarly, when the output buffer is asserting a logic "1", the gate of 320 is pulled all the way to the GND rail thereby assuring that no current flows in transistor 320.

Figure 26:
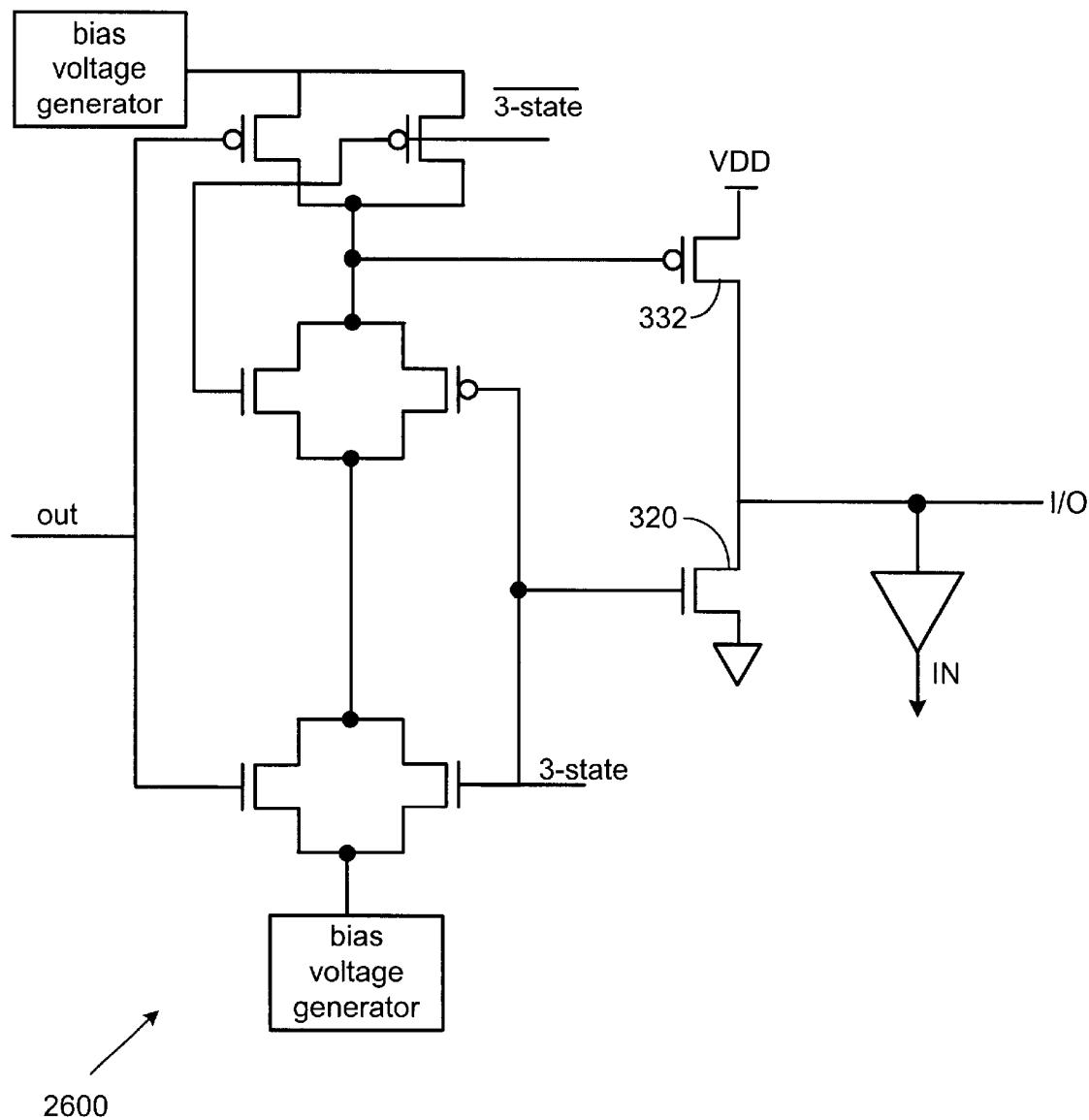
FIG. 26 shows a reduced transistor implementation of the tri-state termination circuit shown in FIG. 4.
Figure 27:
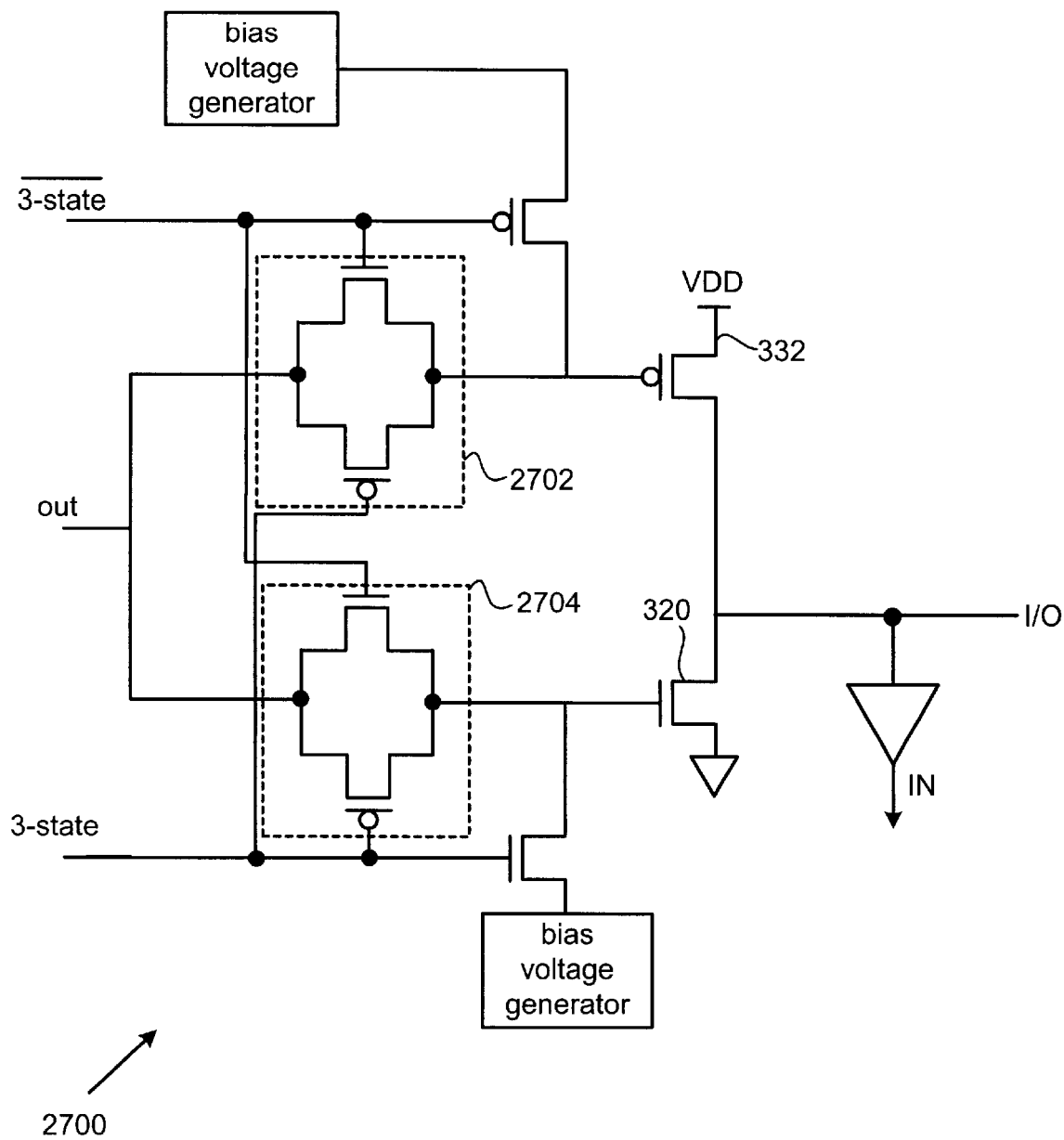
FIG. 27 illustrating a transmission gate type tri-state implementation of the termination circuit shown in FIG. 4.
Figure 28:
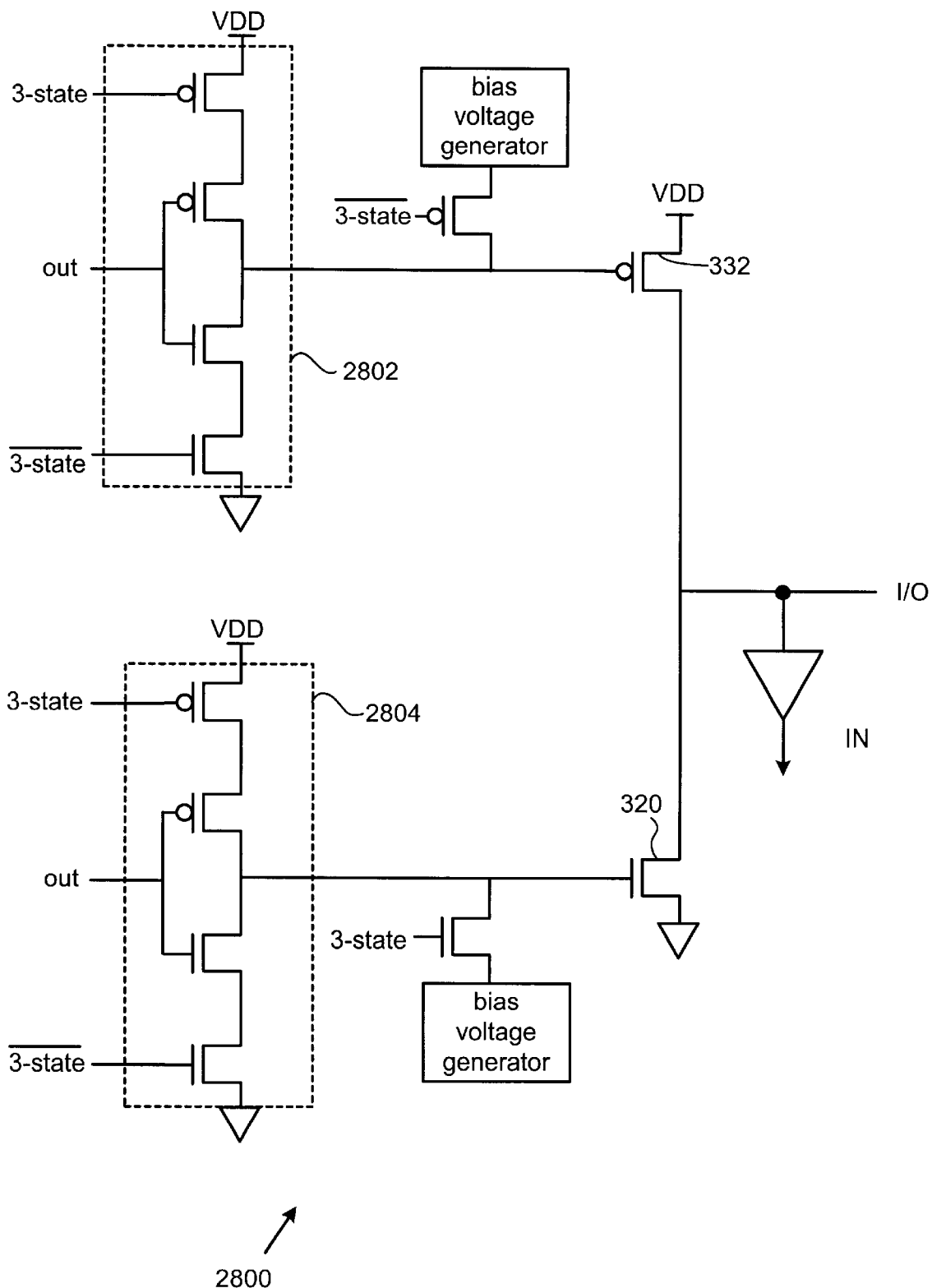
FIG. 28 shows the tri-state termination circuit of FIG. 27 where the transmission gates are each replaced with an associated tri-state inverter.

FIG. 26 shows a reduced transistor tri-state termination circuit 2600 having a reduced number of transistors in accordance with an embodiment of the invention. By using fewer transistors, the termination circuit 2600 is potentially faster and more compact than, for example, the termination circuits 2500 and/or 400. Yet another implementation of the tri-state termination circuit 400 is shown in FIG. 27 illustrating a transmission gate type tri-state termination circuit 2700. Again, as with the tri-state termination circuit 2500 there will be no totem pole current flow through the transistors 332 and 320 when the circuit 2700 is in output buffer mode. It should be noted that each of the transmission gates 2702 and 2704 can be replaced with a tri-state inverter (not shown) which adds an inversion in the output signal path if so desired. With this in mind, FIG. 28 illustrates the tri-state termination circuit 2700 having the transmission gates 2702 and 2704 replaced with tri-state inverters 2802 and 2804, respectively, to form a low DC power tri-state termination circuit 2800.

Figure 29:
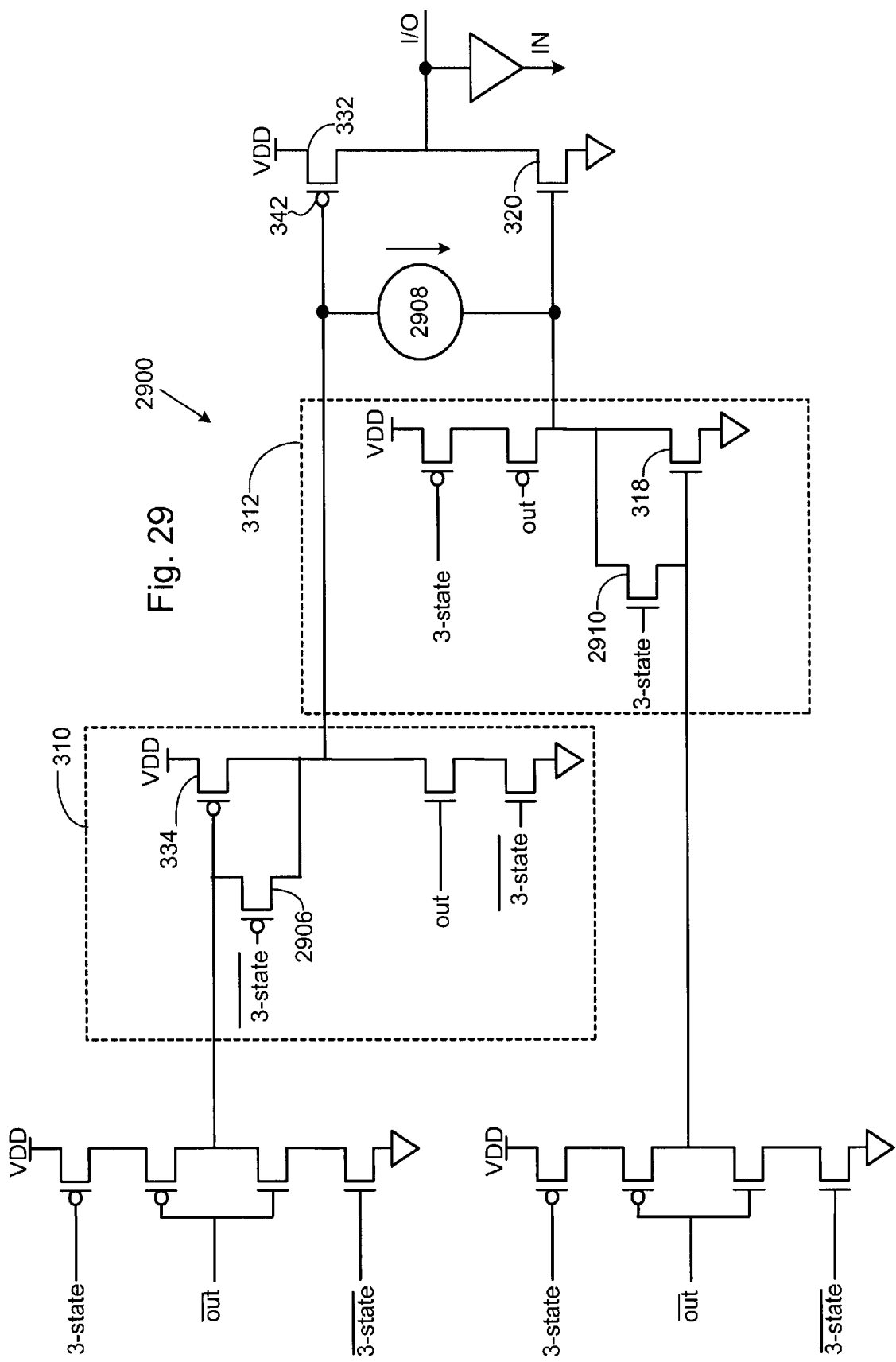
FIG. 29 shows an implementation of the tri-state termination circuit shown in FIG. 4 having a tri-state function incorporated into the bias voltage generator circuit.

FIG. 29 shows a tri-state termination circuit 2900 having a tri-state function incorporated into the bias voltage generator circuits 310 and 312 of FIG. 3 in accordance with another embodiment of the invention. In this arrangement, when the tri-state signal is HIGH (i.e., tri-state signal(bar) is LOW), the gate of transistor 334 is shorted to its drain by the transistor 2906 (i.e., transistor 334 is diode-connected) and a tri-state enabled current source 2908 (i.e., only sources current when tri-state signal is HIGH) causes a current $I_1$, to flow through transistor 334 resulting in the $V_{DD}-V_t$ voltage at the gate 342 of the upper clamping transistor 332. In those situations where the tri-state signal is LOW, the current source 2908 is disabled, n-channel transistor 2910 is off, p-channel transistor 2906 is off such that a signal can propagate from OUT(bar) to the I/O (i.e., drain of 332) undergoing three inversions.

Figure 30:
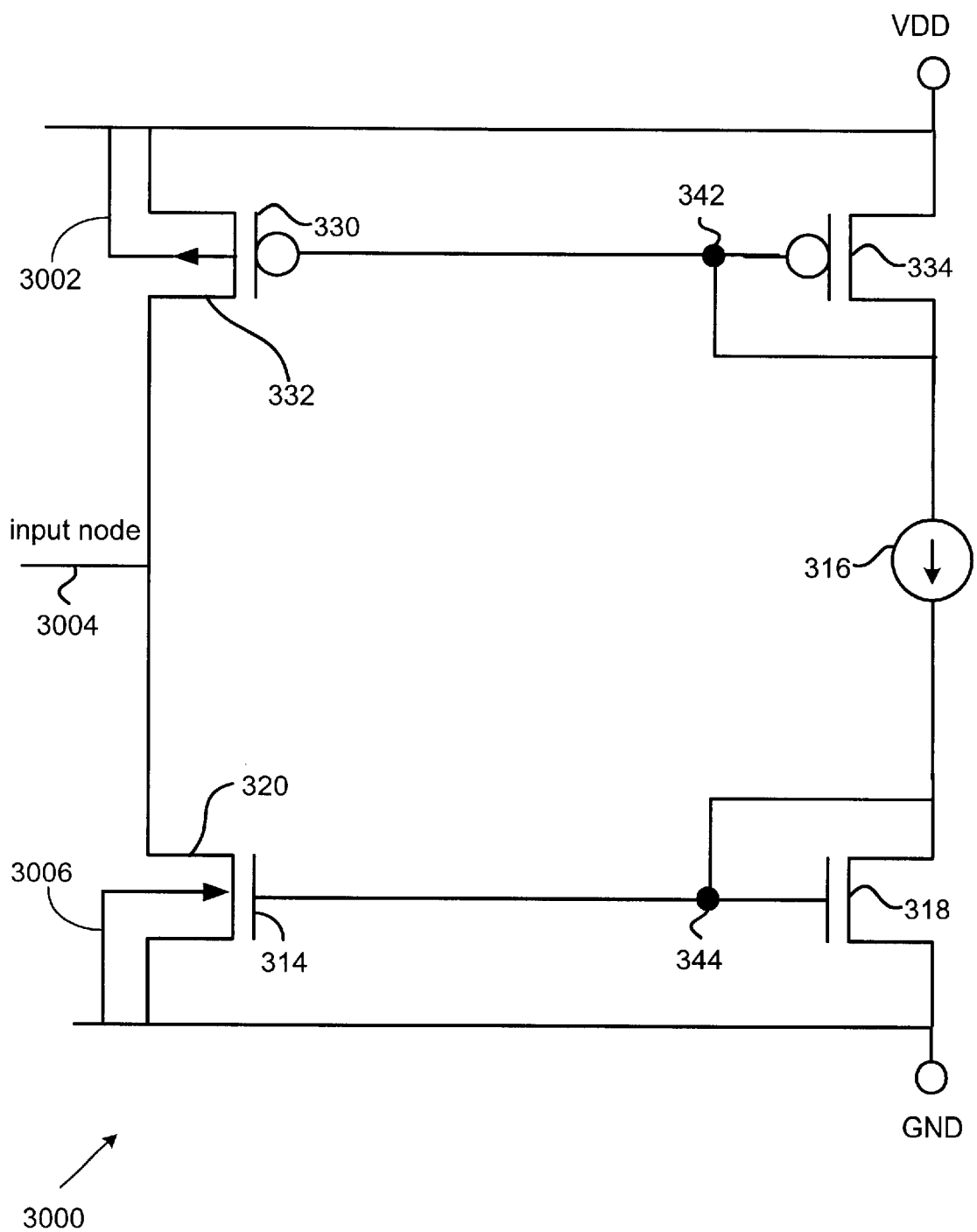
FIG. 30 illustrates using one embodiment of the termination circuit shown in FIG. 3 as an input ESD protection circuit.

Referring back to FIG. 3, the top and bottom clamping transistors 332 and 320, respectively, can also provide substantial electrostatic discharge (ESD) protection over and beyond that which is typically provided for integrated circuits. As is well known in the art, transistors 332 and 320 both have an intrinsic diode connected to the respective power rails as illustrated in FIG. 30. As shown, the intrinsic diode 3002 for transistor 332 connects between $V_{DD}$ and the input node 3004 whereas the intrinsic diode 3006 for the transistor 320 connects between GND and the input node 3004. It is important to note that neither diodes 3002 nor 3006 conduct when the input signal on the input node 3004 is between the two rail voltages (i.e., VDD and GND). Two approaches to increasing the ESD protection beyond that afforded by the intrinsic diodes 3002 and 3006 is to increase the spacing between the source/drain contacts and the gate contacts for the transistors 332 and 320 and by increasing the gate length for both transistors. However, it should also be noted that by increasing the ESD protection to approximately 10 kV (as compared to 2 kV for a standard diode ESD protection circuit), the speed of the circuit may be adversely affected due to the increase in junction and oxide parasitic capacitances discussed above.

While this invention has been described in terms of several preferred embodiments, there are alterations, permutations, and equivalents which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. An active termination circuit for terminating a signal traversing on a transmission line of an electronic device, comprising:
   a bottom clamping transistor coupled to a first potential having a bottom clamping transistor control node arranged for clamping said signal at about a first reference voltage;
   a bottom threshold reference transistor coupled to a first reference voltage supply configured to supply the first reference voltage, wherein the bottom threshold reference transistor provides a first bias voltage to said bottom clamping transistor control node that biases said bottom clamping transistor control node at about a first threshold voltage above said first reference voltage, said first threshold voltage representing a threshold voltage of said bottom clamping transistor;
   a top clamping transistor coupled to a second potential having a top clamping transistor control node arranged for clamping said signal at about a second reference voltage;
   a top threshold reference transistor coupled to a second reference voltage supply configured to supply the second reference voltage, wherein said top threshold reference transistor provides a second bias voltage to said top clamping transistor control node that biases said top clamping transistor control node at about a second threshold voltage below said second reference voltage, said second threshold voltage representing a top clamping transistor threshold voltage;
   a first stabilizing capacitor coupled between said bottom clamping transistor control node and a first stable voltage supply; and
   a second stabilizing capacitor coupled between said top clamping transistor control node and second stable voltage supply.

2. A circuit as recited in claim 1, wherein the first potential and the second potential are each VDD.

3. A circuit as recited in claim 1, wherein the first potential and the second potential are each GND.

4. A circuit as recited in claim 1, wherein the first potential is VDD and wherein the second potential is GND.

5. A circuit as recited in claim 1, wherein the first potential is GND and wherein the second potential is VDD.

6. A circuit as recited in claim 1 wherein said bottom clamping transistor, said top clamping transistor, said bottom threshold reference transistor, and said top threshold reference transistor are fabricated using MOS technology.

7. A circuit as recited in claim 1, wherein the first stable voltage supply is the first reference voltage supply and wherein the second stable voltage supply is the second reference voltage supply.

8. A circuit as recited in claim 1, wherein the first stable voltage supply is the second reference voltage supply and wherein the second stable voltage supply is the first reference voltage supply.

9. A circuit as recited in claim 1, wherein the first stable voltage supply and the second stable voltage supply are each the first reference voltage supply.

10. A circuit as recited in claim 1, wherein the first stable voltage supply and the second stable voltage supply are each the second reference voltage supply.

11. A circuit as recited in claim 1, wherein the first reference voltage is GND and wherein the second reference voltage is VDD.

12. A method for terminating a signal traversing on a transmission line of an electronic device, comprising:
    forming a clamping circuit including,
       coupling a bottom clamping transistor having a bottom clamping transistor control node to a first potential wherein the bottom clamping transistor is arranged to clamp said signal at about a first reference voltage;
       coupling a bottom threshold reference transistor to a first reference voltage supply configured to supply the first reference voltage, wherein the bottom threshold reference transistor provides a first bias voltage to said bottom clamping transistor control node that biases said bottom clamping transistor control node at about a first threshold voltage above said first reference voltage, said first threshold voltage representing a threshold voltage of said bottom clamping transistor;
       coupling a top clamping transistor to a second potential having a top clamping transistor control node arranged for clamping said signal at about a second reference voltage;
       coupling a top threshold reference transistor to a second reference voltage supply configured to supply a second reference voltage, wherein said top threshold reference transistor provides a second bias voltage to said top clamping transistor control node that biases said top clamping transistor control node at about a second threshold voltage below said second reference voltage, said second threshold voltage representing a top clamping transistor threshold voltage;
       coupling a first stabilizing capacitor coupled between said bottom clamping transistor control node and a first stable voltage supply; and
       coupling a second stabilizing capacitor coupled between said top clamping transistor control node and second stable voltage supply.

13. A method as recited in claim 12, wherein the first potential and the second potential are each VDD.

14. A method as recited in claim 12, wherein the first potential and the second potential are each GND.

15. A method as recited in claim 12, wherein the first potential is VDD and wherein the second potential is GND.

16. A method as recited in claim 12, wherein the first potential is GND and wherein the second potential is VDD.

17. A method as recited in claim 12 wherein said bottom clamping transistor, said top clamping transistor, said bottom threshold reference transistor, and said top threshold reference transistor are fabricated using MOS technology.

18. A method as recited in claim 12, wherein the first stable voltage supply is the first reference voltage supply and wherein the second stable voltage supply is the second reference voltage supply.

19. A method as recited in claim 12, wherein the first stable voltage supply is the second reference voltage supply and wherein the second stable voltage supply is the first reference voltage supply.

20. A method as recited in claim 12, wherein the first stable voltage supply and the second stable voltage supply are each the first reference voltage supply.

21. A method as recited in claim 12, wherein the first stable voltage supply and the second stable voltage supply are each the second reference voltage supply.

22. A method as recited in claim 12, wherein the first reference voltage is GND and wherein the second reference voltage is VDD.

* * * * *